US012771948B2

(12) United States Patent
Fukui

(10) Patent No.: US 12,771,948 B2
(45) Date of Patent: Oct. 20, 2026

(54) IMAGE CAPTURING CONTROL APPARATUS, IMAGE PROCESSING APPARATUS, IMAGE CAPTURING CONTROL METHOD, NON-TRANSITORY COMPUTER READABLE STORAGE MEDIUM, IMAGE CAPTURING APPARATUS, AND DEVICE USING THE IMAGE CAPTURING APPARATUS

(71) Applicant: CANON KABUSHIKI KAISHA, Tokyo (JP)

(72) Inventor: Toshiyuki Fukui, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 19/202,427

(22) Filed: May 8, 2025

(65) Prior Publication Data

US 2025/0358530 A1 Nov. 20, 2025

(30) Foreign Application Priority Data

May 15, 2024 (JP) ................................ 2024-079717

(51) Int. Cl.
*H04N 23/73* (2023.01)
*H04N 23/745* (2023.01)

(52) U.S. Cl.
CPC ........... *H04N 23/73* (2023.01); *H04N 23/745* (2023.01)

(58) Field of Classification Search
None
See application file for complete search history.

(56) References Cited

U.S. PATENT DOCUMENTS

| | | | | |
|---|---|---|---|---|
| 7,233,694 | B2 | 6/2007 | Fukui | |
| 7,714,896 | B2 | 5/2010 | Fukui | |
| 8,432,460 | B2 | 4/2013 | Nakasuji | |
| 9,807,356 | B1 * | 10/2017 | Minami | H04N 9/3194 |
| 10,911,690 | B2 | 2/2021 | Nakamura | |
| 11,588,985 | B2 | 2/2023 | Kobayashi | |
| 2007/0046790 | A1 | 3/2007 | Nakasuji | |
| 2016/0143520 | A1 * | 5/2016 | Masaki | A61B 1/0684 600/109 |

(Continued)

FOREIGN PATENT DOCUMENTS

| | | | |
|---|---|---|---|
| JP | 2007-067736 | A | 3/2007 |
| JP | 2020-036128 | A | 3/2020 |

(Continued)

*Primary Examiner* — Cynthia Calderon
(74) *Attorney, Agent, or Firm* — Venable LLP

(57) ABSTRACT

An image capturing control apparatus that causes image capturing to be performed by an image sensor having a plurality of pixel blocks, each of the pixel blocks having a plurality of pixels, comprises a storing unit configured to hold a light emission cycle of a light source that emits light cyclically, and a controller configured to control a first period and a second period in a frame period in the image capturing, the second period following the first period and being shorter than the light emission cycle. For each of the pixel blocks, based on an exposure condition determined for the pixel block, the controller sets a first exposure period in the first period and sets a second exposure period in the second period, The first exposure period including a charge accumulation period longer than or equal to the light emission cycle.

16 Claims, 15 Drawing Sheets

(56) References Cited

U.S. PATENT DOCUMENTS

| | | | | |
|---|---|---|---|---|
| 2017/0126952 | A1* | 5/2017 | Aoyama | G01J 1/4214 |
| 2017/0142312 | A1* | 5/2017 | Dal Mutto | G06T 5/70 |
| 2018/0053799 | A1* | 2/2018 | Otani | G01C 3/06 |
| 2018/0135980 | A1* | 5/2018 | Nakamura | G01C 3/06 |
| 2020/0077009 | A1 | 3/2020 | Nakamura | |
| 2020/0229688 | A1* | 7/2020 | Yoshino | H04N 23/951 |
| 2021/0250486 | A1 | 8/2021 | Kitashou | |
| 2022/0070396 | A1* | 3/2022 | Amikawa | H04N 25/60 |
| 2022/0334233 | A1* | 10/2022 | Imai | G01S 7/4816 |
| 2022/0353405 | A1 | 11/2022 | Kobayashi | |
| 2024/0064416 | A1* | 2/2024 | Wu | H04N 23/745 |
| 2024/0268650 | A1* | 8/2024 | Demura | A61B 1/0638 |
| 2025/0024156 | A1* | 1/2025 | Yorozu | H04N 23/13 |
| 2025/0113101 | A1* | 4/2025 | Nakamura | H04N 23/665 |
| 2025/0189637 | A1* | 6/2025 | Morimoto | G01S 7/4863 |
| 2025/0264583 | A1* | 8/2025 | Tanaka | G01S 7/487 |

FOREIGN PATENT DOCUMENTS

| | | | |
|---|---|---|---|
| JP | 2021-129144 | A | 9/2021 |
| JP | 2022-170437 | A | 11/2022 |

* cited by examiner

FIG. 5 n=4

FLICKER CYCLE 90Hz T=11.11111ms λ=33.33333ms

| SHUTTER SPEED (s) | λ1 (ms) | T1 (ms) | EXPOSURE PERIOD RATIO α | ADDING RATIO K | T2 (ms) |
|---|---|---|---|---|---|
| 1/30 | 33.3333 | 30.5556 | 1 | 1 | 2.7778 |
| 1/60 | 16.6667 | 13.8889 | 2 | 1 | 2.7778 |
| 1/120 | 8.3333 | 11.1111 | 4 | 1/2 | 2.7778 |
| 1/240 | 4.1667 | 11.1111 | 8 | 1/4 | 1.3889 |
| 1/480 | 2.0833 | 11.1111 | 16 | 1/8 | 0.6944 |
| 1/960 | 1.0417 | 11.1111 | 32 | 1/16 | 0.3472 |
| 1/1920 | 0.5208 | 11.1111 | 64 | 1/32 | 0.1736 |
| 1/3840 | 0.2604 | 11.1111 | 128 | 1/64 | 0.0868 |
| 1/7680 | 0.1302 | 11.1111 | 256 | 1/128 | 0.0434 |

FIG. 7

| EXPOSURE PERIOD (1/SECOND) | ANALOG GAIN | | | |
|---|---|---|---|---|
| | ×1 | ×2 | ×4 | ×8 |
| 1/30 | 3 | 2 | 1 | 0 |
| 1/60 | 4 | 3 | 2 | 1 |
| 1/120 | 5 | 4 | 3 | 2 |
| 1/240 | 6 | 5 | 4 | 3 |
| 1/480 | 7 | 6 | 5 | 4 |
| 1/960 | 8 | 7 | 6 | 5 |
| 1/1920 | 9 | 8 | 7 | 6 |
| 1/3840 | 10 | 9 | 8 | 7 |
| 1/7680 | 11 | 10 | 9 | 8 |
| 1/15360 | 12 | 11 | 10 | 9 |
| 1/30720 | 13 | 12 | 11 | 10 |

FIG. 10 n=4

FLICKER CYCLE 90Hz T=11.11111ms λ=33.33333ms

| SHUTTER SPEED (s) | λ1 (ms) | T1 (ms) | EXPOSURE PERIOD RATIO α | ADDING RATIO K | T2 (ms) | CONVERSION COEFFICIENT γ | CONVERSION RATIO G |
|---|---|---|---|---|---|---|---|
| 1/30 | 33.3333 | 30.5556 | 1 | 1 | 2.7778 | 11 | 12 |
| 1/60 | 16.6667 | 13.8889 | 2 | 1 | 2.7778 | 5 | 6 |
| 1/120 | 8.3333 | 11.1111 | 4 | 1/2 | 2.7778 | 4 | 3 |
| 1/240 | 4.1667 | 11.1111 | 8 | 1/4 | 1.3889 | 8 | 3 |
| 1/480 | 2.0833 | 11.1111 | 16 | 1/8 | 0.6944 | 16 | 3 |
| 1/960 | 1.0417 | 11.1111 | 32 | 1/16 | 0.3472 | 32 | 3 |
| 1/1920 | 0.5208 | 11.1111 | 64 | 1/32 | 0.1736 | 64 | 3 |
| 1/3840 | 0.2604 | 11.1111 | 128 | 1/64 | 0.0868 | 128 | 3 |
| 1/7680 | 0.1302 | 11.1111 | 256 | 1/128 | 0.0434 | 256 | 3 |

FIG. 12 n=3

FLICKER CYCLE 90Hz T=11.11111ms λ=33.33333ms

| SHUTTER SPEED (s) | λ1 (ms) | T1 (ms) | EXPOSURE PERIOD RATIO α | ADDING RATIO K | T2 (ms) | CONVERSION COEFFICIENT γ | CONVERSION RATIO G |
|---|---|---|---|---|---|---|---|
| 1/30 | 33.3333 | 29.6296 | 1 | 1 | 3.7037 | 8 | 9 |
| 1/60 | 16.6667 | 12.9630 | 2 | 1 | 3.7037 | 3.5 | 4.5 |
| 1/120 | 8.3333 | 11.1111 | 4 | 1/2 | 2.7778 | 4 | 3 |
| 1/240 | 4.1667 | 11.1111 | 8 | 1/4 | 1.3889 | 8 | 3 |
| 1/480 | 2.0833 | 11.1111 | 16 | 1/8 | 0.6944 | 16 | 3 |
| 1/960 | 1.0417 | 11.1111 | 32 | 1/16 | 0.3472 | 32 | 3 |
| 1/1920 | 0.5208 | 11.1111 | 64 | 1/32 | 0.1736 | 64 | 3 |
| 1/3840 | 0.2604 | 11.1111 | 128 | 1/64 | 0.0868 | 128 | 3 |
| 1/7680 | 0.1302 | 11.1111 | 256 | 1/128 | 0.0434 | 256 | 3 |

FIG. 13 n=2

FLICKER CYCLE 100Hz T=10ms λ=33.33333ms

| SHUTTER SPEED (s) | λ1 (ms) | T1 (ms) | EXPOSURE PERIOD RATIO α | ADDING RATIO K | T2 (ms) | CONVERSION COEFFICIENT γ | CONVERSION RATIO G |
|---|---|---|---|---|---|---|---|
| 1/30 | 33.3333 | 28.3333 | 1 | 1 | 5.0000 | 5.6667 | 6.6667 |
| 1/60 | 16.6667 | 11.6667 | 2 | 1 | 5.0000 | 2.333 | 3.3333 |
| 1/120 | 8.3333 | 10.0000 | 4 | 7/12 | 2.5000 | 4 | 3.3333 |
| 1/240 | 4.1667 | 10.0000 | 8 | 7/24 | 1.2500 | 8 | 3.3333 |
| 1/480 | 2.0833 | 10.0000 | 16 | 7/48 | 0.6250 | 16 | 3.3333 |
| 1/960 | 1.0417 | 10.0000 | 32 | 7/96 | 0.3125 | 32 | 3.3333 |
| 1/1920 | 0.5208 | 10.0000 | 64 | 7/192 | 0.1563 | 64 | 3.3333 |
| 1/3840 | 0.2604 | 10.0000 | 128 | 7/384 | 0.0781 | 128 | 3.3333 |
| 1/7680 | 0.1302 | 10.0000 | 256 | 7/768 | 0.0391 | 256 | 3.3333 |

FIG. 14

| EXPOSURE PERIOD (1/SECOND) | ANALOG GAIN | | | |
|---|---|---|---|---|
| | ×1 | ×2 | ×4 | ×8 |
| 1/30 | 3 | 2 | 1 | 0 |
| 1/60 | 4 | 3 | 2 | 1 |
| 1/120 | 5 | 4 | 3 | 2 |
| 1/240 | 6 | 5 | 4 | 3 |
| 1/480 | 7 | 6 | 5 | 4 |
| 1/960 | 8 | 7 | 6 | 5 |
| 1/1920 | 9 | 8 | 7 | 6 |
| 1/3840 | 10 | 9 | 8 | 7 |
| 1/7680 | 11 | 10 | 9 | 8 |
| 1/15360 | 12 | 11 | 10 | 9 |
| 1/30720 | 13 | 12 | 11 | 10 |

IMAGE CAPTURING CONTROL APPARATUS, IMAGE PROCESSING APPARATUS, IMAGE CAPTURING CONTROL METHOD, NON-TRANSITORY COMPUTER READABLE STORAGE MEDIUM, IMAGE CAPTURING APPARATUS, AND DEVICE USING THE IMAGE CAPTURING APPARATUS

BACKGROUND OF THE INVENTION

Field of the Invention

One disclosed aspect of the embodiments relates to an image capturing control apparatus, an image processing apparatus, an image capturing control method, a non-transitory computer readable storage medium, an image capturing apparatus, and a device using the image capturing apparatus.

Description of the Related Art

In order to widen the dynamic range of an image capturing apparatus, a method has been proposed in which the exposure conditions of an imaging sensor can be changed for each region. Japanese Patent Laid-Open No. 2021-129144 discloses dividing the entirety of the light receiving region of an image sensor into a plurality of regions and setting the exposure period and the amplification gain for analog signals from the sensor for each region.

However, in the case where the exposure period of a certain region is set short, if that region includes a light source that causes flicker, flicker may occur if the exposure period is shorter than the flicker cycle of the light source.

SUMMARY OF THE INVENTION

One disclosed embodiment has been made in consideration of the above-described disadvantage, and provides an advantageous technique for suppressing the effects of flicker on image capturing while also reducing the storage capacity used for processing performed when performing image capturing with a wide dynamic range.

According to one aspect of the disclosure, there is provided an image capturing control apparatus that causes image capturing to be performed by an image sensor having a plurality of pixel blocks, each of the pixel blocks having a plurality of pixels. The image capturing control apparatus comprises a storing unit configured to hold a light emission cycle of a light source that emits light cyclically, and a controller configured to control a first period and a second period in a frame period in the image capturing, the second period following the first period and being shorter than the light emission cycle. For each of the pixel blocks, based on an exposure condition determined for the pixel block, the controller sets a first exposure period in the first period and sets a second exposure period in the second period. The first exposure period including a charge accumulation period longer than or equal to the light emission cycle.

Further features of the present invention will become apparent from the following description of exemplary embodiments with reference to the attached drawings.

BRIEF DESCRIPTION OF THE DRAWINGS

FIG. 5 is a diagram illustrating exposure periods in region-specific exposure control.

FIG. 7 is a diagram illustrating a relationship between the exposure period and the analog gain in region-specific exposure control.

FIG. 10 is a diagram illustrating exposure periods in the second embodiment.

FIG. 12 is a diagram illustrating exposure periods in region-specific exposure control according to the second embodiment.

FIG. 13 is a diagram illustrating exposure periods in region-specific exposure control according to the second embodiment.

FIG. 14 is a graph illustrating a relationship between the exposure period and the analog gain in region-specific exposure control according to a third embodiment.

DESCRIPTION OF THE EMBODIMENTS

Figure 1:
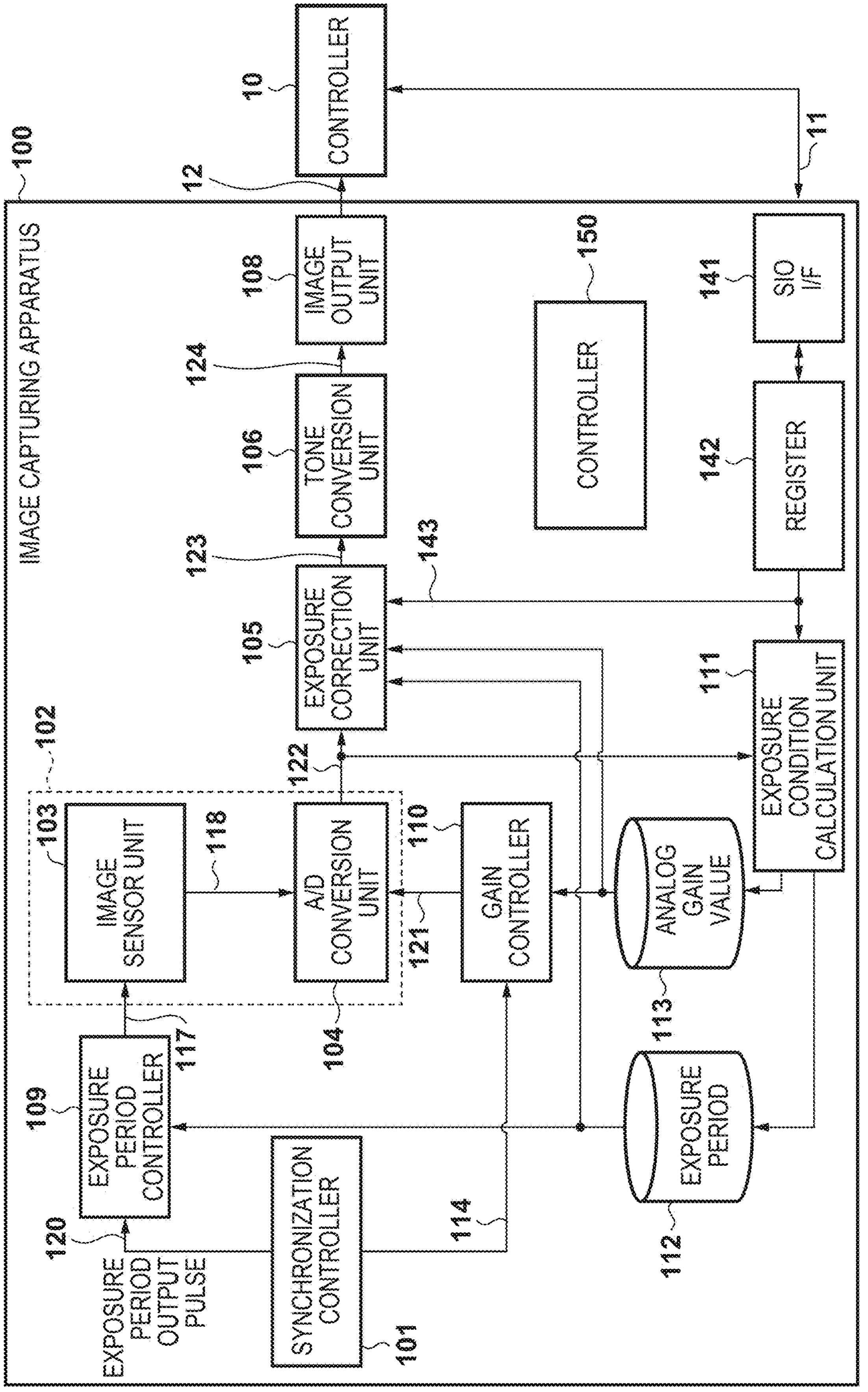
FIG. 1 is a diagram illustrating an example of the schematic configuration of an image capturing apparatus and connection thereof with an external controller.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

FIG. 1 is a block diagram illustrating an example of the schematic configuration of an image capturing apparatus 100 to which an image processing apparatus according to the present embodiment is applied, and connection thereof with an external controller. The image capturing apparatus 100 of the present embodiment also has various components that are included in a general image capturing apparatus, but for the sake of simplicity of illustration and description, FIG. 1 shows exemplary components of the present embodiment. Note that the components described below are merely examples, and the functions of multiple components described below may be combined into one, or individual functions may be distributed among components. Alternatively, a single component may also have other functions.

The image capturing apparatus 100 of the present embodiment includes a synchronization controller 101, an image sensor unit 103, an analog-to-digital (A/D) conversion unit

104, an exposure correction unit 105, a tone conversion unit 106, an image output unit 108, an exposure period controller 109, a gain controller 110, and an exposure condition determination unit 111. Also, in order to reflect settings received from an external controller 10, a serial interface (SIO I/F) 141 and a register 142 for storing setting values are also provided. The image capturing apparatus 100 is connected to the external controller 10 via a serial communication line 11 and an output signal line 12.

An image sensor 102 of the present embodiment can include the image sensor unit 103, in which pixels including photoelectric conversion elements are arranged, and the A/D conversion unit 104 that performs analog-to-digital (A/D) conversion on signals from the pixel unit.

The synchronization controller 101, the exposure period controller 109, the gain controller 110, and the exposure condition determination unit 111 can be called an image capturing control apparatus that controls image capturing. The image capturing control apparatus can include at least any of the synchronization controller 101, the exposure period controller 109, the gain controller 110, and the exposure condition determination unit 111. The exposure correction unit 105 and the tone conversion unit 106 function as an image processing apparatus that performs image processing on an exposure image 122. The image processing apparatus can include at least either one of the exposure correction unit 105 and the tone conversion unit 106. The image capturing apparatus 100 can also include the controller 150 that controls the image capturing apparatus 100. The controller 150 may be included in the units of the image capturing apparatus 100. The controller 150 can control units of the image capturing apparatus 100, such as the synchronization controller 101, the exposure period controller 109, the gain controller 110, the exposure correction unit 105, and the tone conversion unit 106. Also, the controller 150 can perform partial or overall control of the image capturing apparatus 100.

The following describes an overview of the image capturing apparatus 100. The image sensor unit 103 has an imaging region (light receiving region). A plurality of pixels are arranged in the imaging region. The imaging region is further divided into a plurality of regions called pixel blocks, each of which includes a plurality of pixels. The image sensor unit 103 can be driven in units of pixel blocks (regions), and has a function of performing exposure operations with different exposure periods according to exposure conditions determined for each region. The exposure period corresponds to the charge accumulation period during which the photoelectric conversion element included in a pixel can accumulate charge. The pixel blocks will be described later with reference to FIG. 2.

In the present embodiment, the image sensor unit 103 has an exposure period set for each region by an exposure control signal 117 supplied by the exposure period controller 109, and performs exposure with the exposure periods set for the regions. The exposure control signal 117 is a signal for setting the exposure period for each region of the image sensor unit 103. For each region, the image sensor unit 103 reads out the charge accumulated in each pixel for the exposure period set for that region by the exposure control signal 117 as a pixel potential 118 and outputs the pixel potential 118 to the A/D conversion unit 104. The A/D conversion unit 104 performs analog/digital conversion on the pixel potential 118 read out from the image sensor unit 103 for conversion into a digital value. The gain controller 110 can set an analog gain 121 for each region in the A/D conversion unit 104. For each region, the A/D conversion unit 104 amplifies the pixel potential 118 output from the image sensor unit 103 by the analog gain 121 set for that region, and then performs analog/digital conversion to convert the signal into a digital value.

Hereinafter, an image made up of a digital signal obtained by the A/D conversion unit 104 performing analog/digital conversion on the result of region-specific amplification performed by the analog gain 121 will be referred to as the exposure image 122. The exposure image 122 output from the A/D conversion unit 104 is sent to the exposure condition determination unit 111 and the exposure correction unit 105.

Based on the exposure image 122, the exposure condition determination unit 111 can determine the exposure period 112 and the analog gain value 113 for each region such that the imaging conditions are optimal, and update the previous values. For example, for each pixel block, the exposure condition determination unit 111 obtains a histogram of pixel values based on the luminance distribution of the exposure image 122. If the pixel values are distributed toward the bright side, the exposure condition determination unit 111 can change and update the exposure period 112 and the analog gain value 113 of that pixel block (region) to settings that result in a darker image.

Furthermore, if the pixel values are distributed toward the dark side, the exposure condition determination unit 111 can change and update the exposure period 112 and the analog gain value 113 of that pixel block (region) to settings that result in a brighter image. Then, the values of the exposure periods 112 for the regions are sent to the exposure period controller 109 and the exposure correction unit 105. The analog gain value 113 for the regions are sent to the gain controller 110 and the exposure correction unit 105.

The synchronization controller 101 generates an exposure period output pulse 120 and a gain output pulse 114 that are synchronized with each other. The synchronization controller 101 outputs the exposure period output pulse 120 to the exposure period controller 109. The synchronization controller 101 outputs the gain output pulse 114 to the gain controller 110. In this way, the synchronization controller 101 synchronizes the processing of the exposure period controller 109 and the processing of the gain controller 110.

The exposure period output pulse 120 is a signal for controlling the timing at which the exposure period controller 109 outputs the exposure control signal 117 to the image sensor unit 103. The exposure period controller 109 outputs the exposure control signal 117 to the image sensor unit 103 based on the exposure period output pulse 120 to set the exposure period for corresponding pixel blocks of the image sensor unit 103.

Also, the gain output pulse 114 is a signal for controlling the timing at which the gain controller 110 outputs the analog gain 121 to the A/D conversion unit 104. The gain controller 110 outputs the analog gain 121 to the A/D conversion unit 104 based on the gain output pulse 114 to set the gain to be applied to the pixel potential for corresponding pixel blocks. In this manner, in the present embodiment, the synchronization controller 101 controls the exposure period controller 109 and the gain controller 110 so as to operate in synchronization with each other, thus making it possible to output the exposure image 122 in which the exposure period and the analog gain have been applied for each pixel block of the image sensor unit 103.

The exposure period controller 109 generates the exposure control signal 117 for each region based on the exposure period output pulse 120 and the value of the exposure period 112 for the corresponding region, and outputs the signal to the image sensor unit 103. As a result, exposure periods that correspond to the exposure periods 112 for corresponding regions are set in the image sensor unit 103 at an appropriate timing.

The gain controller 110 outputs the analog gain values 113 for the respective regions to the A/D conversion unit 104 in synchronization with the timing of the gain output pulse 114, as the analog gains 121 for the respective regions for the pixel potentials 118 for the respective regions of the image sensor unit 103. As a result, in the A/D conversion unit 104, for each region, the pixel potential 118 for that region is multiplied by the analog gain 121 for the corresponding region, and then analog/digital conversion is performed. The pieces of data obtained by the analog/digital conversion are sent to the exposure correction unit 105 and the exposure condition determination unit 111 as the exposure images 122 for the respective regions.

Upon receiving the exposure images 122 for the respective regions from the A/D conversion unit 104, the exposure correction unit 105 accumulates the exposure images 122 captured under different exposure conditions in the same frame, performs necessary processing, and then performs addition processing for the respective pixel data pieces. The images obtained as a result of the addition processing are subjected to tone expansion processing based on the exposure periods 112 and the analog gain values 113 to generate tone-expanded images 123. For example, the exposure correction unit 105 can generate 23-bit tone-expanded images 123 from 10-bit exposure images 122 for the respective regions. Detailed operation of the exposure correction unit 105 will be described later. The generated tone-expanded images 123 are then sent to the tone conversion unit 106.

The tone conversion unit 106 performs tone conversion on the tone-expanded images 123 and outputs resulting tone-converted images 124 to the image output unit 108. In the present embodiment, the tone conversion is processing for converting, for example, a 23-bit tone-expanded image 123 into, for example, a 12-bit signal by gamma conversion, to generate a tone-converted image 124. The tone conversion process in the present embodiment is performed in order to suppress the data rate in subsequent processing. In the present embodiment, the bit lengths of the exposure images 122 and the tone-converted images 124 are 10 bits and 12 bits, respectively, but these bit lengths are merely examples and are not limited to these.

The image output unit 108 outputs the tone-converted images 124 to a downstream component in the image capturing apparatus 100 or to the outside. In the present embodiment, the controller 10 is connected as the processing module that receives image data from the image capturing apparatus 100. Here, the output signal line 12 connecting the image output unit 108 to the controller 10 may be a low voltage differential signaling (LVDS) line having 16 data channels. However, the type of the signal line and the data channel width are not limited by the present embodiment, and can be selected according to the amount of data and the data speed.

Also, the controller 10 is connected to a serial I/O (SIO) I/F 141 of the image capturing apparatus 100 via the serial communication line 11. The SIO I/F 141 is connected to the register 142, and the controller 10 can set necessary information in the register 142 inside the image capturing apparatus 100 via the SIO I/F 141. The information set in the register 142 is transmitted to the exposure condition determination unit 111 and can be used to determine the exposure conditions.

Figure 2:
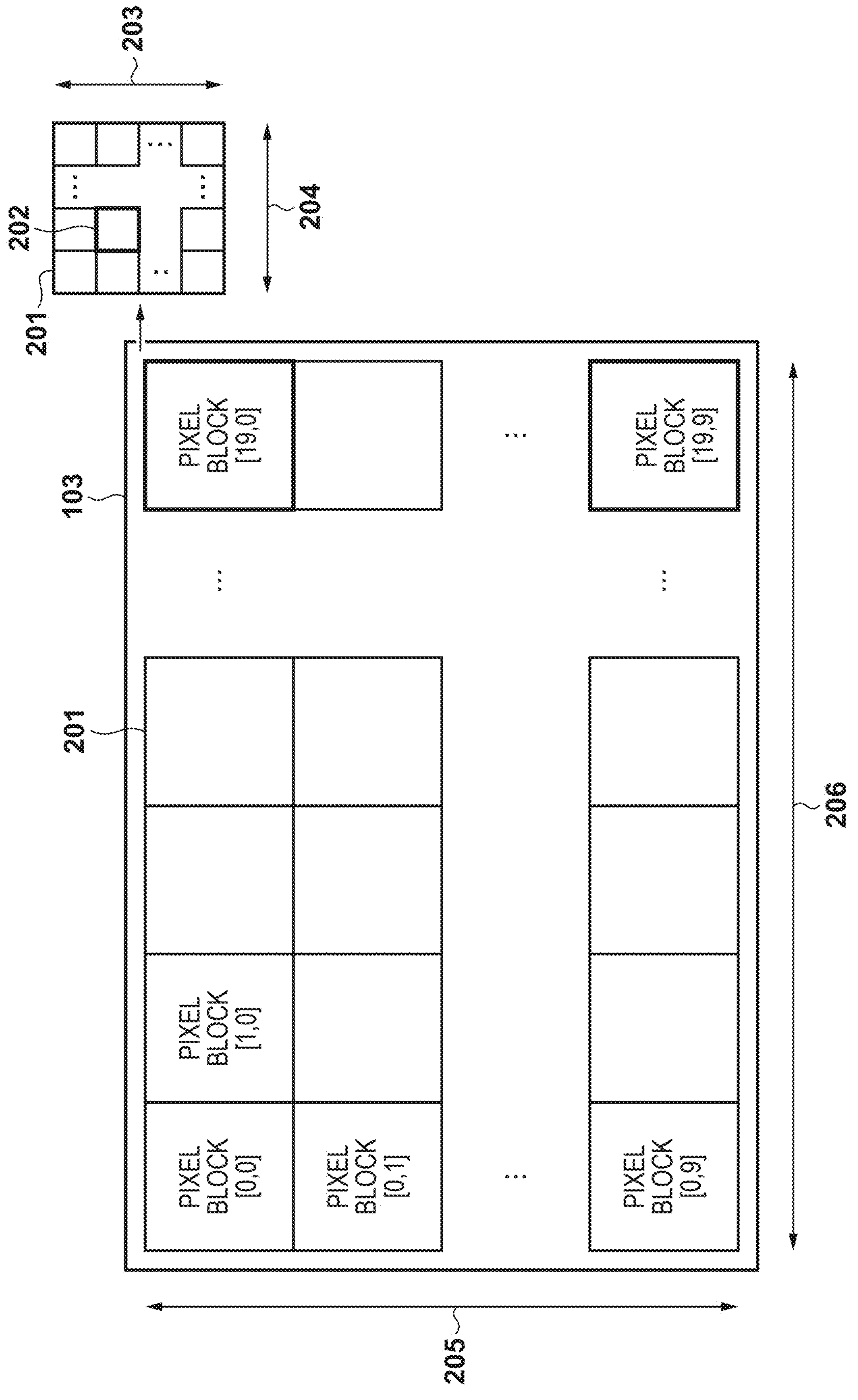
FIG. 2 is a diagram illustrating an image sensor unit.

FIG. 2 is a diagram illustrating an example of the configuration of the image sensor unit 103. The imaging region of the image sensor unit 103 includes a plurality of pixel blocks 201. Furthermore, each of the pixel blocks 201 includes a plurality of pixels 202. In the present embodiment, the number of pixels in a width direction 206 (horizontal line direction) of the imaging region of the image sensor unit 103 is 2000 pixels, and the number of pixels in a height direction 205 is 1000 pixels (i.e., the number of horizontal lines in the vertical direction is 1000 lines). It is also assumed that the number of pixels in a width direction 204 (horizontal line direction) of the pixel block 201 is 100 pixels, and the number of pixels in a height direction 203 is 100 pixels (100 horizontal lines in the vertical direction). In this case, the number of pixel blocks 201 in the imaging region of the image sensor unit 103 is 20 in the horizontal direction and 10 in the vertical direction. These numbers of pixels and lines are merely examples for the purpose of description, and are not limiting.

The notation "pixel blocks [0,0] to [19,9]" written in the pixel blocks 201 shown in FIG. 2 indicates the position of the pixel block 201 in the imaging region. The values in brackets [ ] represent the horizontal and vertical indices of the pixel blocks in the imaging region. In FIG. 2, for example, in the case of the pixel block 201 located in the upper right corner of the image sensor unit 103, this is pixel block [19,0].

Moreover, a set of pixel blocks represented by the same index in the vertical direction is called a block row. A block row N contains pixel blocks [0,N] to [19,N], where N is from 0 to 9 in FIG. 2. For example, a block row 5 includes the pixel blocks [0,5] to [19,5]. Note that the respective sizes (number of pixels in the vertical and horizontal directions) of the image sensor unit 103 and the pixel blocks 201 are not limited to those given in the above-mentioned example. Furthermore, the shape and aspect ratio of the pixel 202 are not limited, and may be rectangular instead of square, for example. Furthermore, the pixel blocks 201 may include only one pixel 202. In the present embodiment, the exposure period and the analog gain can be controlled for each pixel block 201.

Here, the exposure period corresponds to the charge accumulation period during which charge is accumulated in the pixels (light receiving elements) of the image sensor unit 103 during image capturing. Therefore, for example, if the quantity of incident light incident on the image sensor unit 103 is the same and the pixels are not saturated, the pixel potential 118 increases as the exposure period increases, and a brighter image can be captured. In other words, if the quantity of incident light is the same and pixel saturation is not taken into consideration, when comparing an exposure period of 1/480 seconds with an exposure period of 1/30 seconds, a brighter image can be captured when the exposure period is 1/30 seconds.

The analog gain is the gain applied to the pixel potential 118 in the A/D conversion unit 104 during image capturing. Therefore, the larger the analog gain value is, the larger the digital pixel value (digital value obtained by analog/digital conversion performed on the result of gain application) output from the A/D conversion unit 104 is.

Returning to FIG. 1, the configuration and operation of the image capturing apparatus 100 of the present embodiment will be described. In the image sensor unit 103, the exposure period is controlled for each region, that is, for each pixel block 201, based on the exposure control signal 117, and image capturing is performed. The image sensor unit 103 then outputs the pixel potentials 118 corresponding to the charge accumulated in the pixels.

Upon receiving the pixel potentials 118 output from the image sensor unit 103, the A/D conversion unit 104 applies the analog gains 121 set for the respective pixel blocks of the image sensor unit 103, performs digital conversion, and outputs the exposure images 122. In the present embodiment, for the sake of description, it is assumed that the exposure images 122 are each a 10-bit digital value. Also, the analog gain 121 can take four gain values, for example, ×1, ×2, ×4, and ×8.

The exposure correction unit 105 performs tone expansion processing on the exposure images 122 received from the A/D conversion unit 104, based on the exposure periods 112 and the analog gain values 113 set for the respective regions, and outputs the tone-expanded images 123. The exposure correction unit 105 recognizes under what conditions the exposure images 122 for the respective regions were captured, based on the exposure periods 112 for the respective regions and the analog gain values 113 for the respective regions. Then, the exposure correction unit 105 corrects the exposure images 122 for the respective regions based on the conditions under which the exposure images 122 for the respective regions were captured.

The exposure correction unit 105 performs tone expansion processing on the exposure images 122 for the respective regions received from the A/D conversion unit 104, based on the exposure periods 112 and the analog gain values 113 applied during image capturing, thereby generating the tone-expanded images 123. For example, the exposure correction unit 105 recognizes the conditions under which the input exposure images 122 for the respective regions were captured based on the exposure periods 112 for the respective regions and the analog gain values 113 for the respective regions, and corrects the exposure images 122 for the respective regions according to the recognized conditions.

Furthermore, the exposure correction unit 105 performs tone expansion processing on the exposure images 122 for the respective regions represented by, for example, 10 bits to generate the tone-expanded images 123 represented by 23 bits. The generated tone-expanded images 123 are then sent to the tone conversion unit 106.

Figure 3:
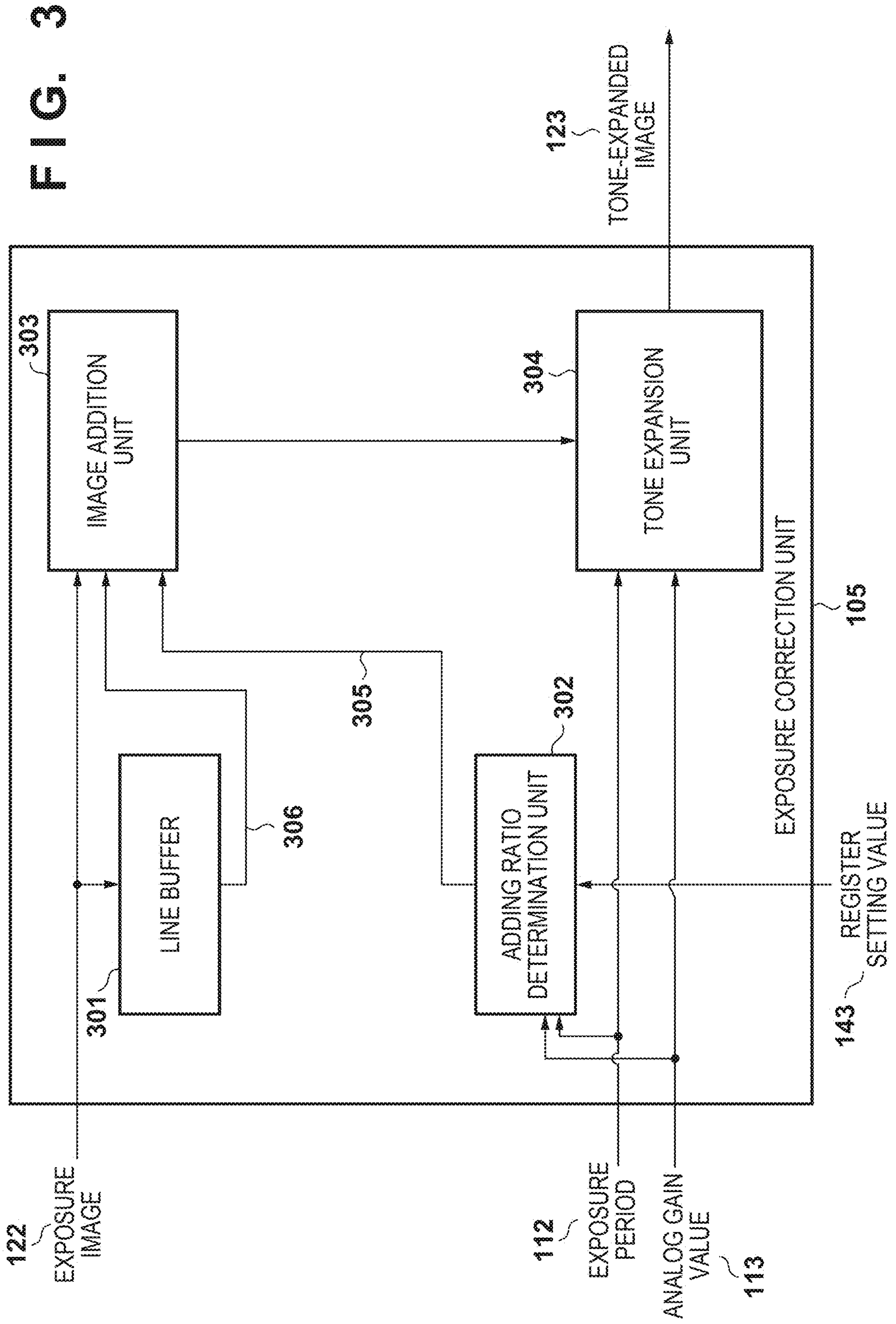
FIG. 3 is a diagram illustrating an example of the configuration of an exposure correction unit according to a first embodiment.

Next, operation of the exposure correction unit 105 will be described. FIG. 3 is a block diagram illustrating an example of the configuration of the exposure correction unit 105. The exposure correction unit 105 includes a line buffer 301 as a memory unit, an adding ratio determination unit 302, an image addition unit 303, and a tone expansion unit 304.

Figure 4:
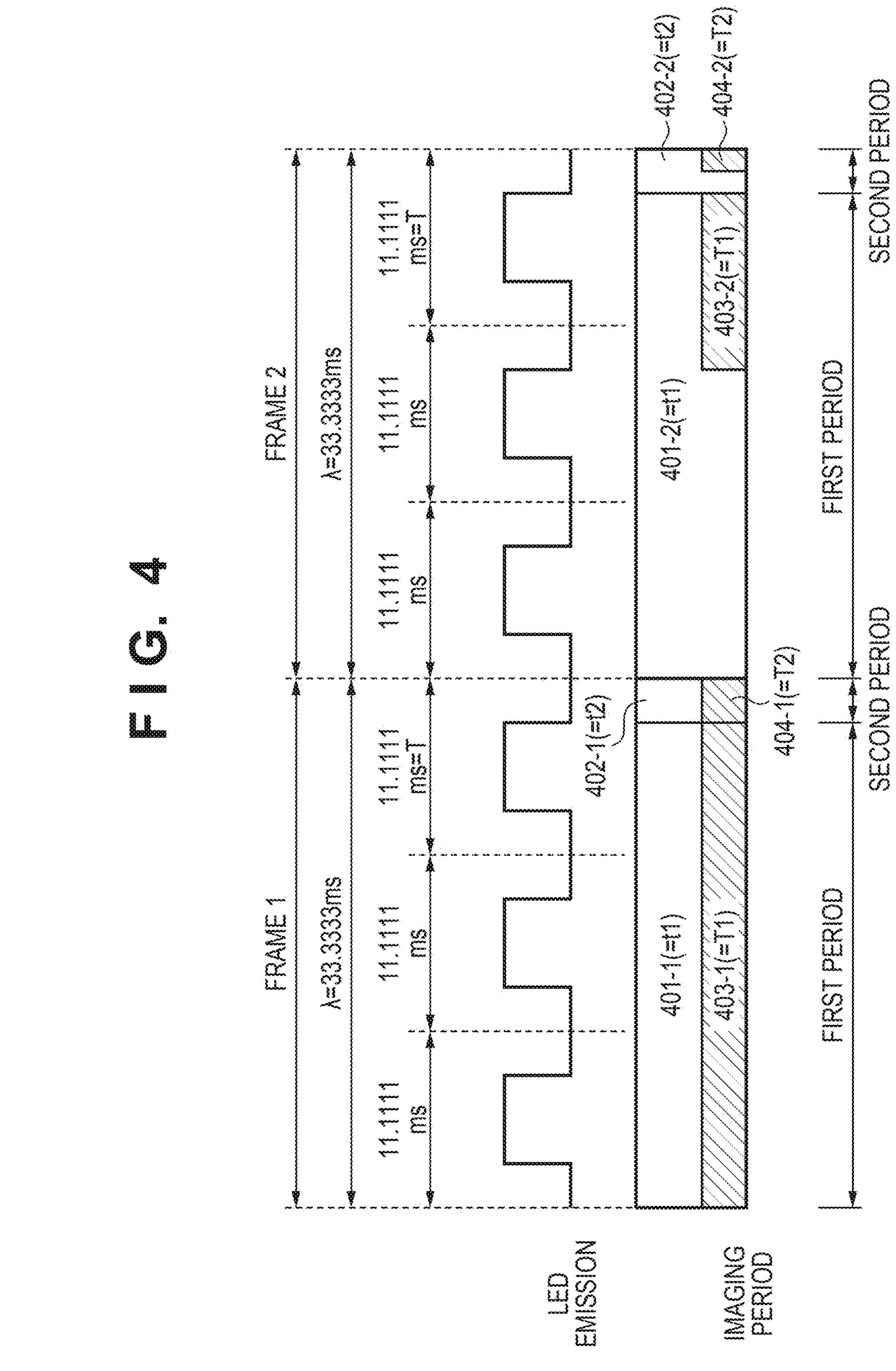
FIG. 4 is a diagram illustrating a relationship between the exposure period control and the light emission cycle of a LED light source that is the imaging subject.

Operation of the components of the exposure correction unit 105 shown in FIG. 3 will be described below with reference to FIGS. 4 and 5. FIG. 4 is a diagram illustrating an example of the relationship between the control of the exposure period and the light emission cycle of the LED light source of the imaging target in the present embodiment.

In the description of the present embodiment, the image output frame rate when the image capturing apparatus 100 captures a moving image is 30 frames/second. The frame period 2 for the frame rate is 1/30 seconds (33.3333 ms (rounded off to the fifth decimal place, which similarly applies below)). Also, regarding the source of flicker, the maximum emission frequency of the LED light source that may be included in the imaging target is 90 Hz, and the light is emitted at a constant cycle with a duty of 50%. In this case, the longest light emission cycle T of the light source that can cause flicker is 1/90 seconds (11.1111 ms).

In the present embodiment, the imaging period of each frame is divided into first periods 401-1 and 401-2 in the first half of the frame and second periods 402-1 and 402-2 in the second half of the frame following the first period, and the periods are defined as shown in FIG. 4. In the following, when the first period is described without being limited to either one, it is written as "first period 401", and when the second period is described without being limited to either one, it is written as "second period 402".

In the example of FIG. 4, it is assumed that the second period 402 in the latter half is t2, which is determined by 1/n of T (n is an integer of 2 or more, where n=4 in the example in FIG. 4). In this case, t2 is 1/4 of 11.1111 ms, which is 2.7778 ms. In the present embodiment, the first period 401 can be the remaining period when the second period 402 is subtracted from one frame period 2. The length of the first period 401 is represented as t1. Here, t1=λ−t2, and in the present embodiment, t1=30.5556 ms. In FIG. 4, the first exposure periods in the first period 401 are represented as 403-1 and 403-2, and the second exposure periods in the second period are represented as 404-1 and 404-2. Note that in the following, when the first exposure period is described without being limited to either one, it will be referred to as the first exposure period 403, and when the second exposure period is described without being limited to either one, it will be referred to as the second exposure period 404.

Control of the exposure periods of the image sensor in the first period 401 and the second period 402 is performed by the exposure period controller 109 based on the exposure periods 112 determined by the exposure condition determination unit 111 in FIG. 1. The light emission cycle T of the LED light source for which flicker is to be reduced and a division number n that determines the length of the second period are set in the register 142 by the external controller 10 and can be distributed from the register setting value 143. The exposure condition determination unit 111 determines the length of the second period using the light emission cycle T and the division number n supplied as register setting values 143. In the present embodiment, as will be described later, the length of the first period is determined according to the length of the second period. The exposure period controller determines the first period and the second period based on the length of the second period, and sets the exposure period for each of them.

The exposure period in the first period is a first exposure period T1, and the exposure period in the second period is a second exposure period T2. The exposure periods can each be determined based on the exposure image 122 in the second period of the previous frame, based on an algorithm for determining exposure conditions for region-specific exposure. The exposure conditions may be determined using a table. Here, when the length of the frame period is λ, λ1 represents the appropriate exposure period that is determined by the exposure condition determination unit 111 to be set as the region-specific exposure based on the exposure image 122. Here, the proper-exposure period λ1 is an exposure period that is to be set as the proper-exposure period for one frame period λ when one frame period is not considered as being divided into a first period and a second period.

Since one frame period is divided into the first period and the second period when performing image capturing, when compositing the images captured in the first period and the second period, the image captured in the first period is converted as shown below. Through this conversion, the image signals captured in the first imaging period and the second imaging period are converted into image signals captured in the proper-exposure period λ1. The image signal obtained in the first imaging period is a first image signal O1, the image signal obtained in the second imaging period is a second image signal O2, and the composite image signal of both is a composite image signal O3. The first image signal O1 is multiplied by an adding ratio k shown in FIG. 3 and added to the second image signal O2 to obtain the composite image signal O3. This relationship is expressed as O3=k× O1+O2, where k is the value of the adding ratio. Hereinafter, the adding ratio k will be described for three cases.

Case 1

The first exposure period is T1, the second exposure period is T2, and the proper-exposure period is λ1. T is the longest light emission cycle of a light source that corresponds to flicker among light sources that emit light periodically, and λ is the frame period, which is the moving image capturing period, that is, one frame period. The second period T2 is T/n. Moreover, the exposure period ratio α of the frame period λ to the proper-exposure period λ1 is set as follows:

$$\alpha = \lambda / \lambda 1 \tag{1}$$

$$\text{Condition 1: } \lambda 1 \geq (1 + 1/n) \times T$$

This is the case where the proper-exposure period λ1 is longer than or equal to the sum of the length T/n of the second period and the light emission cycle T. In this case, the second exposure period is equal to the second period, and the first exposure period is longer than the light emission cycle T.

Therefore, the following relationship can be established:

$$T1 = \lambda 1 - T2 \tag{2}$$

$$T2 = T/n \tag{3}$$

T2 is equal to the length of the second period. At this time, since T1>T, the first image signal O1 can be used as is. Therefore, the value of the adding ratio k is as follows:

$$k = 1 \tag{4}$$

In this way, in Case 1, since λ1 is greater than the sum of the length of the second period and the length of the light emission cycle T, image capturing can be performed with the proper-exposure period λ1.

Case 2

The proper-exposure period λ1 is greater than the light emission cycle T. In the second period, exposure is performed for a duration equal to the length t2 of the second period, and in the first period, exposure is performed for the length of the light emission cycle T, and therefore this is a case in which the combined exposure period of the exposure period of the first period and the exposure period of the second period may exceed the proper-exposure period λ1. The condition for Case 2 is as follows:

$$\text{Condition 2: } (1 + 1/n) \times T > \lambda 1 \geq T$$

Here, this is expressed as follows:

$$T1 = T \tag{5}$$

$$T2 = T/n \tag{3}$$

T2 is equal to the length of the second period t2. Also, T1 is equal to T. In the present embodiment, n=4 as described above.

In this case, since the first exposure period T is longer than the proper-exposure period λ1, correction is performed using the adding ratio k. Specifically, the following expression holds:

$$\lambda 1 = T \times k + T2 \tag{6}$$

Substituting expression (3) into the above expression to find k gives the following:

$$k = \lambda 1/T - 1/n \tag{7}$$

Case 3

When the proper-exposure period λ1 is smaller than T, that is, when:

$$\text{Condition 3: } \lambda 1 < T$$

In this case, the second exposure period T2 is set to T/α, and the exposure period T of the first period is corrected using the adding ratio k. In this case, the following expression holds:

$$\lambda 1 = T \times k + T2$$

Calculate the above expression for k.

See the following relationships:

$$\alpha = \lambda / \lambda 1 \tag{1}$$

$$T1 = T \tag{5}$$

$$T2 = T/\alpha \tag{8}$$

From the above relationships, the adding ratio k can be expressed as follows:

$$k = ((\lambda/T) - 1)/\alpha \tag{9}$$

In the present embodiment, λ=33.3333 ms and T=11.1111 ms, and therefore the following holds:

$$k = ((33.3333/11.1111) - 1)/\alpha = (3 - 1)/\alpha = 2/\alpha$$

Note that when λ1≥(1+1/n)×T, by substituting expression (3) into expression (2), according to the following relationship, it can be said that T1 is greater than or equal to T.

$$T1 = \lambda 1 - T2 = \lambda 1 - T/n \geq (1 + 1/n) \times T - T/n = T$$

Furthermore, according to expression (5), when (1+1/n)×T>λ1, T1=T, and therefore it can be said that the first period T1 will always have a duration greater than or equal to T.

FIG. 5 shows the above relationship in terms of shutter speed. FIG. 5 is a table showing the relationship between T1, T2, λ1, and k in the present embodiment. In this case, the length of one frame period is 33.3333 ms, T=11.1111 ms, and n=4. For example, if the shutter speed to be set as one frame period in region-specific exposure is 1/30 seconds, then λ1 at that time is 33.3333 ms. Since λ1≥(1+1/n)×T, then k=1. Similarly, when the shutter speed is 1/60 seconds, k=1.

If the shutter speed to be set as one frame period in region-specific exposure is 1/960 seconds, then λ1 at that time is 1.0417 ms. Since λ1<T, the case corresponds to Case 3, and the following can be obtained from expressions (1), (5), (6), and (8):

$$\alpha = \lambda/\lambda 1 = 32$$

$$T1 = T = 11.1111 \text{ ms}$$

$$T2 = T/\alpha = 11.1111/32 = 0.3472 \text{ ms}$$

$$\text{Also, } k = 2/\alpha = 1/16.$$

As shown in FIG. 5, within the normal shutter speed setting range, the shutter speed is not set to a value that satisfies (1+1/n)×T>λ1≥T in Case 2, and therefore the case corresponding to expression (7) is not shown in FIG. 5.

Such calculation is performed in the exposure condition determination unit 111, and the values of T1 and T2 are set as the exposure period 112. In this case, it is preferable that the analog gain value 113 is set to 1, except when the shutter speed is 1/30 seconds. As will be described in detail in the description of FIG. 7, when setting the same exposure conditions, there are a number of possible combinations of shutter speed and analog gain. However, from the viewpoint of noise, in order to realize the same exposure conditions, it is preferable to use as long a shutter speed as possible and to make the analog gain as small as possible. For this reason, in the present embodiment, the analog gain is set to the minimum of 1, except when the shutter speed is 1/30 seconds. When the shutter speed is 1/30 seconds, a predetermined analog gain value determined by region-specific exposure can be set.

The length of the light emission cycle T can be determined depending on the location where the image capturing apparatus is to be used as a product. Also, the length can be set in advance as data to be read by the external controller 10, and can be set in the register 142 which is the storing unit of the image capturing apparatus. A configuration is also possible in which the location is determined using location information such as GPS, and when the image capturing apparatus is started up, the external controller 10 refers to a table corresponding to the location information and sets the light emission cycle T or sets information that enables determining the light emission cycle T in the register 142.

Operation of the exposure correction unit 105 will be described below with reference to FIG. 3. First, the exposure image 122 in the first period of frame 1 in FIG. 4 is input to the exposure correction unit 105. Here, the image signal of the exposure image 122 in the first period of a certain frame at a certain pixel position is the first image signal O1. The data of the first image signal O1 is first stored in the line buffer 301. After the second period has elapsed, the exposure image 122 of the second period in a frame 1 is input. At this time, the image signal of the exposure image 122 in the second period of the same frame is the second image signal O2. At the point in time when the second image signal O2 is supplied as the exposure image 122, the image addition unit 303 reads out the data of the first image signal O1 from the line buffer 301 as a delay image 306.

At this time, the memory unit that held the data of the first image signal O1 in the first period for a certain frame of the line buffer 301 holds the data of the first image signal O1 for the length of the second period. After the data of the first image signal O1 is read out, the memory unit is reused to hold the first image signal O1 of the exposure image 122 in the first period at another pixel position that is input after the data is read out. By shortening the length of the second period, the memory unit is repeatedly used more frequently, and as a result, it is possible to reduce the capacity of the memory unit built into the sensor.

Figure 6:
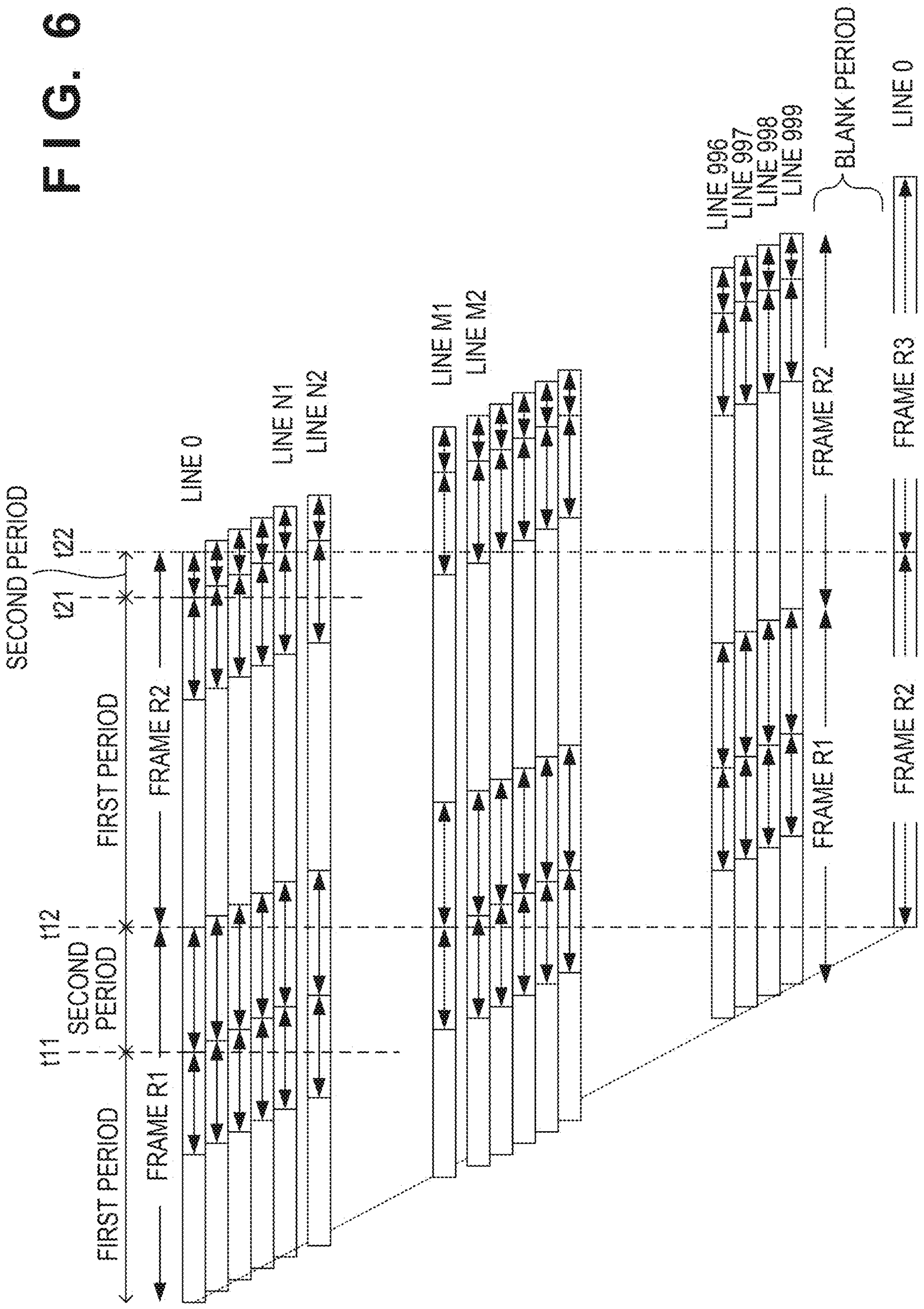
FIG. 6 is a diagram illustrating reduction in storage capacity.

This relationship will be described below with reference to FIG. 6, which shows the data read timing. For the sake of illustration, FIG. 6 shows that the second period of a frame R1 is set longer than the second period of a frame R2. In FIG. 6, the period between times t11 and t12 is the second period of the frame R1, and the period between times t21 and t22 is the second period of the frame R2. The time between the times t11 and t12 is longer than the time the between times t21 and t22 in FIG. 6. The periods indicated by the arrows on the lines in FIG. 6 indicate the periods during which the pixels on the lines are in an exposed state. The vertical direction in the figure indicates deviation between the exposure timing and the data read timing of the rows read out by the rolling shutter method. In the present embodiment, there are 1000 lines in the vertical direction, and therefore there are lines from 0 to 999. After line 999, there is a blank period, and then line 0 of the next frame begins. In the figure, the frame R2 of the 0th line at the top and the frame R2 of the 0th line at the bottom are the same. Also, in the figure, N1<N2<M1<M2.

Data in the first period of the frame R1 at the line indicated by line 0 needs to be stored at least from the time t11 to time t12. This is because it is necessary to composite the data of the first period and the data of the second period for the frame R1 at line 0. As can be seen from FIG. 6, the time when the reading of data in the second period of the frame R1 ends is a time t12. At this time, the data of the first period at line 0 stored in the memory unit is read out and composited.

On the other hand, the time when data of the first period at the line indicated by line M1 is read out is also the time t12. In this case, if data reading for the first period at line 0 and data writing for the first period at line M1 cannot be performed simultaneously in the memory unit, the memory unit needs to have a storage capacity capable of holding data from line 0 to line M1. In this case, a storage capacity of M1 times the amount of data to be held per line is required. At the point in time, after t12, when data of the first period at the line indicated by line M2 is read out, data of the first period at the line 0 in the memory unit has already been read out. Therefore, the memory unit that has been used to hold data for line 0 can now be used to hold data for line M2.

On the other hand, since the exposure period of the data in the second period in the frame R2 has been shortened, it is sufficient that the data in the first period of the frame R2 at the line indicated by the 0th line is stored from a time t21 to a time t22. In this example, the time when data of the first period at the line indicated by line N1 is read out is the time t22. Therefore, if the frame R2 is considered in the same way as frame R1, the memory unit only needs to have a storage capacity large enough to hold data from line 0 to line N1. As described above, since N1<M1, the capacity of the line buffer 301 of the exposure correction unit 105 can be reduced by shortening the second period of the frame.

Next, the composite image signal O3 of the first image signal O1 and the second image signal O2 can be calculated based on an adding ratio k 305 determined by the adding ratio determination unit 302, using the following expression (10).

$$O3 = kO1 + O2 \tag{10}$$

The adding ratio k is determined by the adding ratio determination unit 302. The adding ratio determination unit 302 obtains the value of λ1 as the exposure period 112. The adding ratio determination unit 302 determines the values of the first exposure period T1 and the second exposure period T2 from the value of λ1, the values of T and n distributed as the register setting value 143, and the value of λ held as the system. From that result, the adding ratio determination unit 302 determines the adding ratio k by the above-mentioned expression (4), expression (7), or expression (9).

When the adding ratio k is a value smaller than 1, in calculating the value of the composite image signal O3 in expression (10), the portion smaller than the significant digit is rounded down. As shown in FIG. 5, when the value of λ1 determined in the region-specific exposure is small, k is also small, and the contribution rate of the first image signal O1 to the composite image signal O3 is smaller than that of the second image signal O2. Furthermore, depending on the exposure period, the first image signal O1 may be saturated. In the present embodiment, O1 is a period longer than or equal to the light emission cycle of the LED light source, and prevents the LED light source from being turned off when it is included in the imaging target. Although the contribution rate to the composite image signal O3 is small, the configuration of the present embodiment makes it possible to prevent the turned off state.

Next, a method for implementing tone expansion in the tone expansion unit 304 will be described with reference to FIG. 7. FIG. 7 is a table showing the relationship between exposure period and analog gain in region-specific exposure control. This table is applied when the frame rate is 30 fps, and shows the relationship between exposure period and analog gain for the entirety of one frame period. In FIG. 7, the numbers at the locations of intersections of the analog gain and exposure period in the horizontal direction in the table are referred to as EV values. The EV value is a power of 2 that represents the ratio of brightnesses of the imaging target when the pixel values obtained by image capturing are the same. If L0 is the brightness of an imaging target with an analog gain of 8 and an exposure period of 1/30 seconds, and the same pixel value is obtained when performing image capturing with an EV value of E, then a brightness LE of the subject can be expressed by the following expression (11).

$$LE = L0 \times 2 \wedge E \tag{11}$$

In this specification, the symbol "^" indicates exponentiation. In other words, A^B means A to the power of B. For example, when the analog gain is 1 and the exposure period is 1/30 seconds, the EV value is 3. Similarly, when the analog gain is 1 and the exposure period is 1/60 seconds, the EV value is 4. In this case, if the pixel values obtained by image capturing are the same, a subject in an image captured under the condition of an EV value of 4 is twice as bright as a subject in an image captured under the condition of an EV value of 3.

In region-specific exposure, a table such as that shown in FIG. 7 can be used to estimate the brightness of the subject in a region from the pixel value captured in the previous frame and the exposure conditions used at that time, and to determine the exposure conditions to be used for capturing the next frame.

In FIG. 3, the composite image signal O3 of O1 and O2 determined by the image addition unit 303 based on expression (10) is transmitted to the tone expansion unit 304. The tone expansion unit 304 calculates the EV value shown in FIG. 7 from the exposure period 112 and the analog gain value 113 of the corresponding pixel block. If the EV value at that time is E, the pixel value after tone expansion can be calculated based on expression (11).

For example, assume that the exposure condition for the frame 1 shown in FIG. 4 is λ1=33.3333 ms, and the analog gain at this time is ×2. At this time, as shown in FIG. 4, an exposure period 403-1 is 30.5556 ms, which is the same as in the first period, and an exposure period 404-1 in the second period is 2.7778 ms, which is the same as in the second period. Under these exposure conditions, the EV value is calculated to be 2 according to FIG. 7. In this case, if the composite image signal after addition processing of the frame 1 is O31 and the value of the signal after tone expansion is O41, then, using expression (11), O41=O31×2^2=4×O31.

Similarly, for example, the exposure condition for the frame 2 shown in FIG. 4 is λ1=4.1667 ms (1/240S), and the analog gain at this time is ×1. At this time, as shown in FIG. 4, the exposure period 403-2 is 11.1111 ms, which is the same as T, and the exposure period 404-2 in the second period is 1.3889 ms. Under these exposure conditions, the EV value is calculated to be 6 according to FIG. 7. In this case, if the composite image signal after addition processing of the frame 2 is O32 and the value of the signal after tone expansion is O42, then, using expression (11), O42=O32×2^6=64×O32.

In this case, if the bit width of the original exposure image of O32 is 10 bits, according to this calculation, O42 is a 16-bit. In the case of the present embodiment, it is understood from FIG. 7 that the highest value that the EV value can take is 13. In this case, if the exposure correction unit 105 performs tone expansion, the bit width of the data becomes larger. In the present embodiment, the tone-expanded image 123 may take up to 23 bits. Thereafter, as described above, the tone conversion unit 106 generates, for example, a 12-bit tone-converted image 124 by gamma conversion from the 23-bit tone-expanded image 123.

According to the present embodiment, by appropriately combining the image signal in the first period and the image signal in the second period, flicker can be suppressed even if a light source with a flicker cycle, such as an LED light source, is present in the imaging range. Furthermore, it is possible to perform wide dynamic range (WDR) image capturing by taking advantage of the characteristics of region-specific exposure. Furthermore, by appropriately shortening the length of the second period, it is possible to reduce the capacity of the memory unit required to hold the image signal of the first period, which contributes to size reduction and cost reduction of the image capturing apparatus.

Second Embodiment

In the first embodiment, the output image is always a composite image of the image signals in the first period and the second periods, but since the length of the exposure period in the first period is fixed regardless of the brightness of the imaging target, the output is likely to become saturated under conditions determined for a bright subject by region-specific exposure. In the second embodiment, to handle such a case, it is determined whether or not the imaging target includes a light source that generates flicker, and the compositing ratio of the first period and the second period is adaptively changed. The present embodiment will be described below with reference to FIGS. 8 to 11. Note that points other than those described below are similar to those in the first embodiment.

Figure 8:
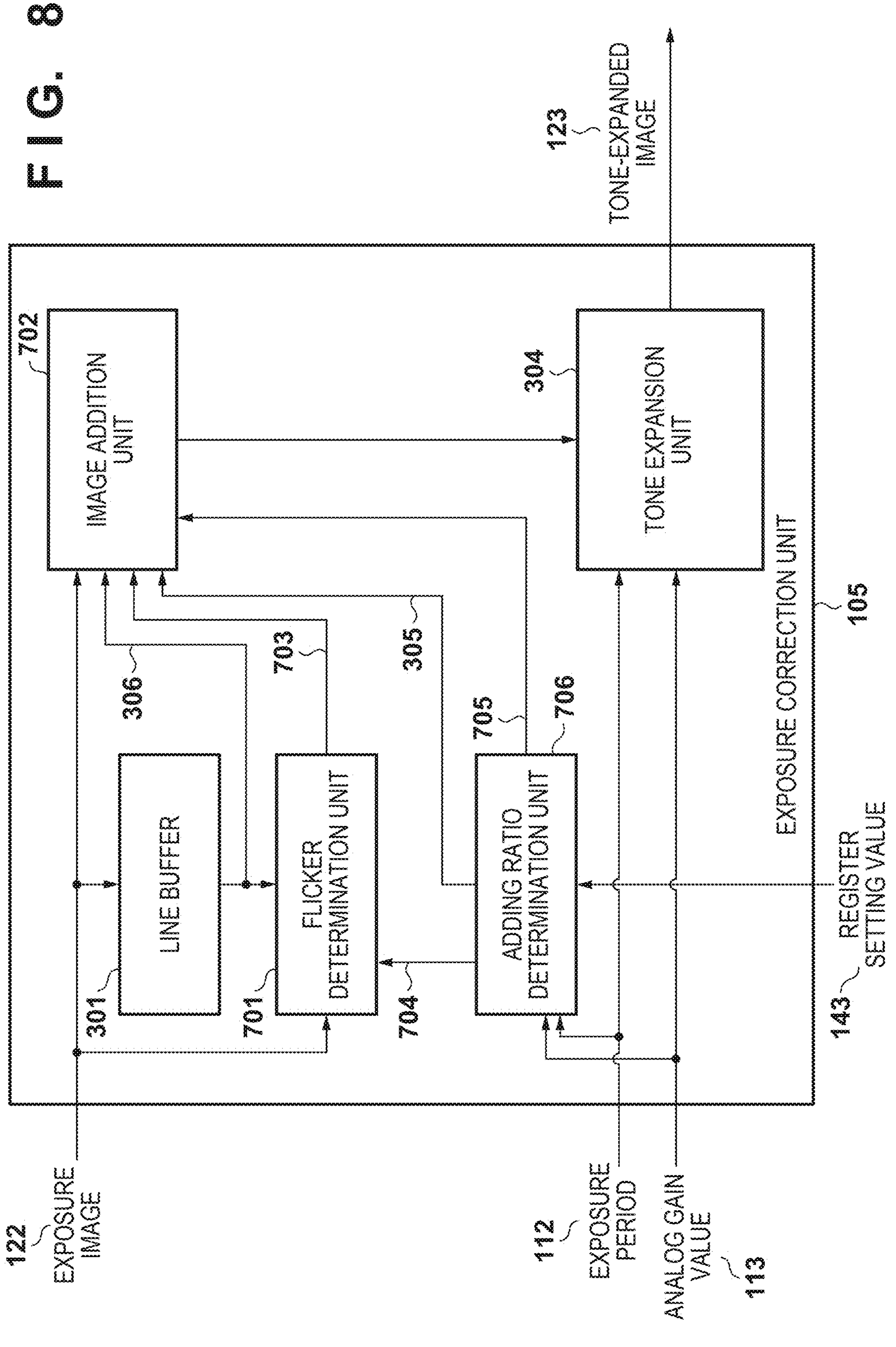
FIG. 8 is a diagram illustrating an example of the configuration of an exposure correction unit according to a second embodiment.

FIG. 8 is a block diagram illustrating an example of the configuration of the exposure correction unit 105 according to the second embodiment. The exposure correction unit 105 includes the line buffer 301, an adding ratio determination unit 706, a flicker determination unit 701, an image addition unit 702, and the tone expansion unit 304. Furthermore, the longest light emission cycle T of a LED light source to be subjected to flicker prevention and the division number n to be set are received from the register 142 as the register setting value 143 and are used in the adding ratio determination unit 706. Components similar to those in the first embodiment are denoted by the same numbers as those in FIG. 3 in the first embodiment.

Operation of the components of the exposure correction unit 105 shown in FIG. 8 will be described below with reference to the example shown in FIG. 4. Most of the operations of the exposure correction unit 105 in the second embodiment are the same as those in the first embodiment, and the differences will be mainly described here.

In FIG. 8, first, the exposure image 122 in the first period of the frame 1 in FIG. 4 is input to the exposure correction unit 105. In the present embodiment as well, the image signal of the exposure image 122 in the first period of a certain frame at a certain pixel position will be referred to as the first image signal O1. The data of the first image signal O1 is first stored in the line buffer 301. After the second period has elapsed, the exposure image 122 of the second period in a frame 1 is input. The image signal of the exposure image 122 in the second period of the same frame at this time will be referred to as the second image signal O2. At the point in time when the second image signal O2 is supplied as the exposure image 122, the flicker determination unit 701 reads out the data of the first image signal O1 from the line buffer 301 as the delay image 306. Then, a conversion coefficient $\gamma$ 704 determined by the adding ratio determination unit 706 is used to determine whether or not flicker has occurred at the pixel, and a flicker determination result 703 is transmitted to the image addition unit 702.

Operation of the flicker determination unit 701 will be described later. The image addition unit 702 delays the data of the first image signal O1 read out as the delay image 306 and the data of the second image signal O2 supplied as the exposure image 122 by the length of time required for the flicker determination unit 701 to determine the flicker determination result 703. Similarly, the adding ratio k 305 and a conversion ratio G 705 provided from the adding ratio determination unit 706 are also delayed. After adjusting the timing, the flicker determination result 703 is used to determine the composite image signal O3. Operation of the image addition unit 702 will be described later.

Figure 9:
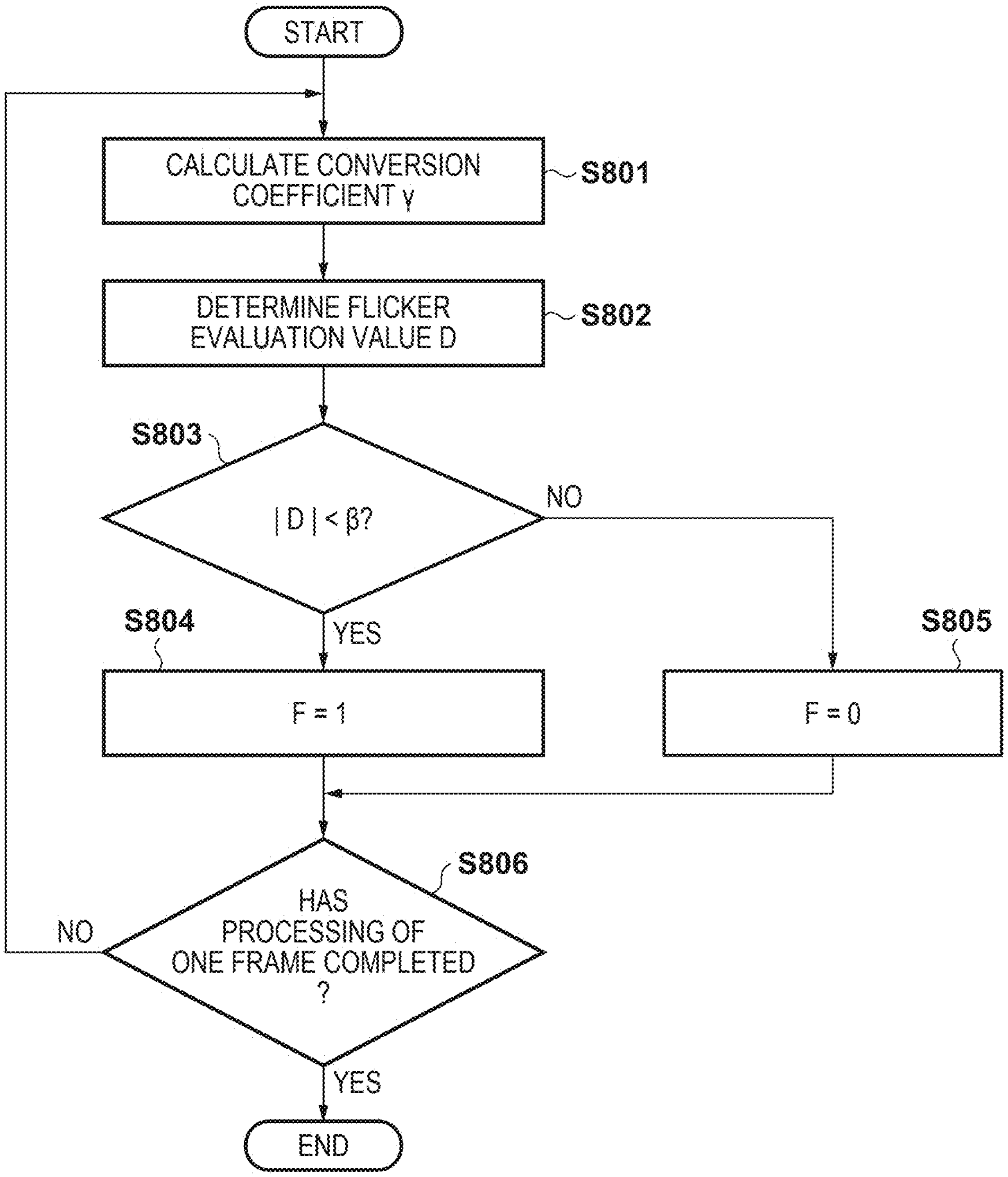
FIG. 9 is a flowchart illustrating a flow of processing in the second embodiment.

FIG. 9 is a flowchart showing an example of processing for determining the flicker determination result 703 in the flicker determination unit 701 and the adding ratio determination unit 706. In step S801, for each pixel, the adding ratio determination unit 706 determines the conversion coefficient $\gamma$ 704 for determining flicker by comparing O1 and O2. The conversion coefficient $\gamma$ is for correcting for the difference in exposure period.

The conversion coefficient $\gamma$ can be calculated using the following expression (12).

$$\gamma = T1/T2 \tag{12}$$

Here, when $\lambda1 \geq T$, substituting expressions (2) and (3) into expression (12) gives the following:

$$\gamma = T1/T2 = (\lambda1 - T2)/T2 = \lambda1/T2 - 1 = n\lambda1/T - 1 \tag{13}$$

On the other hand, when $\lambda1 < T$, substituting expressions (5) and (8) into expression (12) gives the following:

$$\gamma = T1/T2 = T/T2, \; = T/(T/\alpha) = \alpha \tag{14}$$

FIG. 10 is a table showing an example of the relationship between T1, T2, and $\lambda1$ and the exposure period ratio $\alpha$, the adding ratio k, the conversion coefficient $\gamma$, and the conversion ratio G (described later) in the present embodiment. In FIG. 10, the length of one frame period is $\lambda$=33.3333 ms, T=11.1111 ms, and n=4.

For example, if the shutter speed to be set as one frame period in region-specific exposure is 1/30 seconds, then $\lambda1$ at that time is 33.3333 ms. Since $\lambda1 \geq T$, according to expression (13), the following is obtained:

$$\gamma = n\lambda1/T - 1 = 4 \times 33.3333/11.1111 - 1 = 12 - 1 = 11$$

Similarly, if the shutter speed to be set as one frame period in region-specific exposure is 1/960 seconds, then $\lambda1$ at that time is 1.0417 ms. Since $\lambda1 < T$, the following can be obtained from expressions (1) and (14).

$$\gamma = \alpha = \lambda/\lambda1 = 32$$

Such calculation is performed in the adding ratio determination unit 706, and the result is output to the flicker determination unit 701 as the conversion coefficient $\gamma$ 704.

Next, in step S802, a flicker evaluation value D is determined for each pixel. The flicker evaluation value D is the difference between the image signal O1 corrected by the conversion coefficient $\gamma$ and the image signal O2, and is an evaluation of the magnitude of this difference. The subsequent processing of S802 to S805 is carried out by the flicker determination unit 701.

The flicker evaluation value D can be calculated by the following expression (15) using the data of the first image signal O1, the data of the second image signal O2, and the conversion coefficient γ determined by the adding ratio determination unit 706.

$$D = O1 \times \gamma - O2 \tag{15}$$

Next, in step S803, it is determined whether or not flicker is occurring for each pixel. Here, β is a threshold value for determining whether or not flicker is occurring. If the absolute value of the flicker evaluation value D obtained in step S802 is smaller than β, it is determined that flicker is not occurring, the result in step S803 is Yes, and the processing proceeds to step S804. Otherwise, it is determined that flicker is occurring, the result in step S803 is No, and the processing proceeds to step S805. In the second embodiment, β is a predetermined threshold value, and is set in the image addition unit 702. However, the method for setting β is not limited to this, and for example, similarly to the division number n, the value can be changed as necessary by being set in the register 142 from the external controller 10.

In step S804, when F is the flicker determination result, F=1 is set, which means that flicker is not occurring. The value of F is transmitted to the image addition unit 702 as the flicker determination result 703. On the other hand, in step S805, the value of F indicating the flicker determination result is set to F=0, which means that flicker has occurred. In this case as well, the value of F is similarly transmitted to the image addition unit 702 as the flicker determination result 703.

In step S806, it is determined whether or not the processing of determining the flicker evaluation value D has been completed for all of the pixels in one frame. If the processing has not been completed, that is, if the determination result is No in step S806, the processing from S801 onwards is repeated. If the processing has been completed, that is, if the determination result is Yes in step S806, this process is ended. The processing from S801 to step S806 is executed in a pipeline manner in synchronization for each pixel in the adding ratio determination unit 706 and the flicker determination unit 701.

Figure 11:
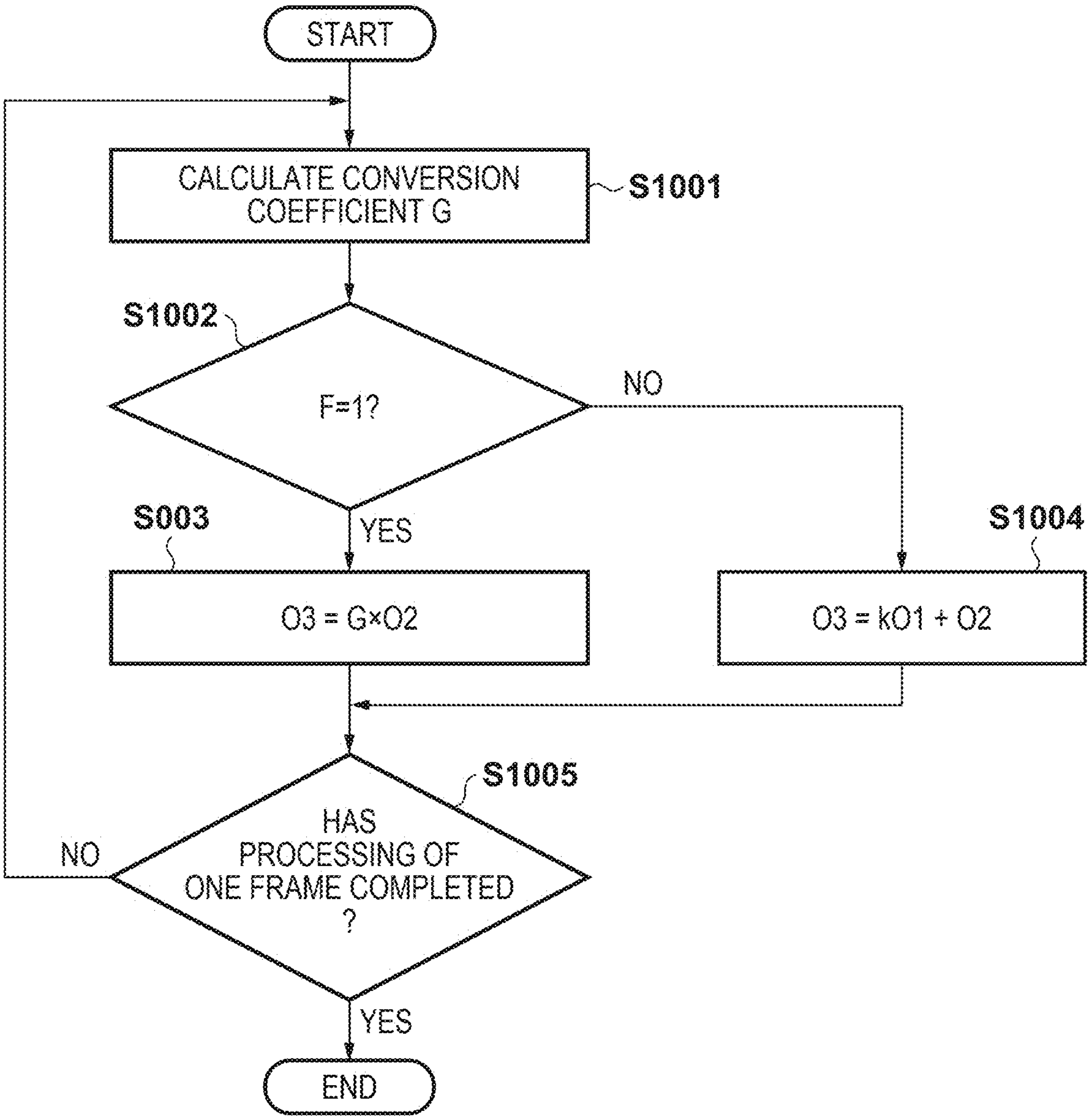
FIG. 11 is a flowchart illustrating a flow of processing in the second embodiment.

FIG. 11 is a flowchart showing an example of processing performed by the image addition unit 702 and the adding ratio determination unit 706 to calculate the conversion ratio G 705 and obtain the composite image signal O3. In step S1001, the adding ratio determination unit 706 determines the conversion ratio G. The conversion ratio G is a coefficient for converting the image signal value O2 obtained by the region-specific exposure control in the latter half of the second period 402 so that it is treated as the pixel value of the frame when it is determined that there is no flicker (F=1). In other words, the conversion ratio G is a coefficient for converting the second image signal captured during the second exposure period T2 into a signal captured during the proper-exposure period λ1.

The conversion ratio G can be calculated using the following expressions 16 and 17.

$$\text{When } \lambda 1 \geq T \tag{16}$$
$$G = \lambda 1 / T2$$

-continued $$\text{When } \lambda 1 < T \tag{17}$$
$$G = \lambda / T$$

Refer again to FIG. 10. FIG. 10 is a table showing an example of the relationship between T1, T2, and λ1 and the exposure period ratio α, the adding ratio k, the conversion coefficient γ, and the conversion ratio G in the present embodiment. In FIG. 10, the length of one frame period is λ=33.3333 ms, T=11.1111 ms, and n=4.

For example, if the shutter speed to be set as one frame period in region-specific exposure is 1/30 seconds, then λ1 at that time is 33.3333 ms. Since λ1≥T, according to expression (16), the following is shown:

$$G = \lambda 1 / T2 = 33.3333/2.7778 = 12$$

Similarly, if the shutter speed to be set as one frame period in region-specific exposure is 1/960 seconds, then λ1 at that time is 1.0417 ms. Since λ1<T, according to expression (17), the following holds:

$$G = \lambda / T = 33.3333/11.1111 = 3$$

Such calculation is performed for each pixel in the adding ratio determination unit 706, and the result is output to the image addition unit 702 as the conversion ratio G (705).

Next, in step S1002, for each pixel, the flicker determination result F is referenced to determine the calculation method for the pixel value O3 to be output. If F=1 and flicker is not occurring (S1002—Yes), the processing proceeds to step S1003. On the other hand, if F=0 and flicker has occurred in the pixel (S1002—No), the processing proceeds to step S1004.

In step S1003, the pixel value O3 to be output in the case where flicker has not occurred is determined using the following expression (18). Then, the processing proceeds to step S1005.

$$O3 = G \times O2 \tag{18}$$

In step S1004, the pixel value O3 to be output when flicker has occurred is calculated using expression (10) shown in the first embodiment. Then, the processing proceeds to step S1005. In step S1005, it is determined whether or not the processing of the pixel value O3 has been completed for all the pixels in one frame. If the processing has not been completed (No in step S1005), the processing from step S1001 onwards is repeated. When the processing has been completed, if the answer is "Yes" in step S1005, this process is ended.

The composite image signal O3 of O1 and O2 generated in this way is transmitted to the tone expansion unit 304. The details of the subsequent processing are similar to those in the first embodiment, and therefore will not be described here. Note that in the present embodiment, the case where n=4 has been described as an example, but the value of n can also be 2 or 3. FIG. 12 shows a table showing the relationship between T1, T2, α, k, γ, and G corresponding to various exposure conditions (shutter speed) when n=3, λ=33.3333 ms, and T=11.1111 ms.

Also, FIG. 13 shows a table showing the relationship between T1, T2, α, k, γ, and G corresponding to various exposure conditions (shutter speed) when n=2, 2=33.3333 ms, and T=10.0000 ms. In FIG. 13, the light emission cycle T is assumed to be 1/100 seconds as the longest light emission cycle of the light source for which flicker is to be prevented. In general, the larger the value of n is, the shorter the length of the second period can be, and therefore from the viewpoint of the capacity of the memory unit required to hold the image signal of O1, a larger value of n is advantageous. However, when n is 5 or more, the relationship shown in the present embodiment may not hold, and therefore it is preferable to use a value of 2, 3, or 4 for n.

According to the second embodiment, by determining whether or not there is a light source that generates flicker in the imaging target and adaptively changing the compositing ratio of the first period and the second period, it is possible to obtain an appropriate image with a widened dynamic range (WDR image). Furthermore, by appropriately shortening the length of the second period, it is possible to reduce the capacity of the memory unit required to hold the image signal of the first period, which contributes to size reduction and cost reduction for the sensor element.

Third Embodiment

In the first embodiment and the second embodiment described above, the analog gain value 113 is set to 1 except when the shutter speed is 1/30 seconds. This is an example in which all 11 exposure period settings from 1/30 seconds to 1/30720 seconds are possible, as shown in FIG. 7.

However, in some cases, it may not be possible to use all of these shutter speeds. For example, there may be cases where it is not possible to provide the same number of shutter speed transmission signal lines as the number of types of shutter speeds. In such cases, it is necessary to use an analog gain to obtain equivalent exposure conditions as EV values. Such a case will be described below with reference to FIG. 14.

In FIG. 14, the combinations of exposure periods and analog gains that can be used to indicate EV values are limited by white boxes, along with shutter speeds that can be used in the present embodiment. In the present embodiment, the light emission cycle is T=11.1111 ms, the frame length is λ=33.3333 ms, and the division number is n=4. In the present embodiment, only five exposure periods are available, namely 1/30 sec, 1/60 sec, 1/480 sec, 1/3840 sec, and 1/30720 sec. For example, in order to use an EV value of 6, in FIG. 7, a combination of the analog gain of ×1 and the exposure period of 1/240 seconds could be used. In the present embodiment, as shown in FIG. 14, it is necessary to use a combination of the analog gain of ×2 and the exposure period of 1/480 seconds.

Furthermore, even among the exposure periods that can be used, the effects of noise become greater as the analog gain increases, and therefore if the same EV value can be achieved under different exposure conditions with a smaller analog gain, priority is given to using the smaller analog gain. Therefore, even among the exposure periods that can be used, combinations of an analog gain and an exposure period that are not given priority for use are indicated by hatching with diagonal lines in the table.

Assuming that the output values of the pixels captured at a usable shutter speed and analog gain are those of an image captured using a shutter speed for the analog gain of ×1, which has the same EV value according to the table in FIG. 14, the calculation expressions presented in the first embodiment and the second embodiment are applied. For example, if an image is captured with the exposure condition EV value of 6, which is a combination of the analog gain of ×2 and the exposure period of 1/480 seconds, the image is regarded as having been captured with a combination of the analog gain of ×1 and the exposure period of 1/240 seconds, which have the same EV value of 6. Then, the calculation expressions presented in the first embodiment and the second embodiment are applied to determine the values of γ, G, and the like. Note that this value conversion is performed by the adding ratio determination unit 706.

In the first embodiment and the second embodiment, the exposure period λ1 to be set differs depending on the relationship with the longest light emission cycle T of the LED light source for which flicker is to be prevented.

When λ1≥T, according to expression 2, the following holds:

$$T1 = \lambda 1 - T2 \tag{2}$$

However, when λ1<T, according to expression 5, the following holds:

$$T1 = T \tag{5}$$

Therefore, when actually converting the relationship between the exposure period and the usable shutter speed, it is necessary to take into consideration whether λ1 is larger or smaller than T.

For example, in FIG. 14, in the case where the EV values are 7, 6, and 5, even when the analog gain is ×1, the following holds true under the condition of 1/120 seconds with the longest λ1.

$$\lambda 1 = 1/120 \text{ seconds} = 8.3333 \text{ ms} < T$$

Therefore, according to expression 5, the following holds:

$$T1 = T = 11.1111 \text{ ms}$$

On the other hand, when the EV value is 4 and the analog gain is ×1, the following holds:

$$\lambda 1 = 1/60 = 16.6667 \text{ ms} \geq T$$

Therefore, according to expression 2, the following holds:

$$T1 = \lambda 1 - T2 = 11.6667 \text{ ms}$$

At this time, if image capturing is performed with an EV value of 4, an analog gain of ×8, and a shutter speed of 1/480, the following holds:

$$\lambda 1 = 1/480 \text{ seconds} = 2.0833 \text{ ms} < T1$$

Accordingly, the pixels are exposed at T1=11.1111 ms.

On the other hand, the shutter speed is 1/60 seconds when the EV value is 4 and the analog gain is ×1, and therefore the exposure period at this time is λ1=16.6667 ms, and since T1>λ1, it can be seen from FIG. 10 that T1=13.8889 ms. When the exposure period differs in this way for the same EV value, the processing in the adding ratio determination unit 706 becomes complicated.

Therefore, in the present embodiment, an example is shown in which the shutter speed is selected using λ1=1/90 seconds, which is equivalent to T=11.1111 ms, as the threshold value. In other words, the shutter speed is selected such that there is no need to convert the relationship between the exposure period and the shutter speed for all threshold values when the exposure period λ1 for the analog gain of ×1 is smaller than the threshold value and larger than the threshold value.

In actuality, with the conditions of the EV values 5 and 6 when λ1=1/120 seconds and λ1=1/240 seconds, at which the exposure period λ1 for the analog gain of ×1 is smaller than the threshold value, image capturing is performed by changing the analog gain using the shutter speed of λ1=1/480 seconds. On the other hand, in the case of λ1=1/60 seconds, at which the exposure period λ1 for the analog gain of ×1 is greater than the threshold value, a shutter speed is assigned, thus making it possible to set an analog gain of ×1.

According to the third embodiment, even when the number of settable shutter speeds is limited, by using an equivalent exposure condition as an EV value using an analog gain, it is possible to obtain an image suitable as a WDR image. Furthermore, by appropriately shortening the length of the second period, it is possible to reduce the capacity of the memory unit required to hold the image signal of the first period, which contributes to size reduction and cost reduction for the sensor element.

Fourth Embodiment: Application of Image Capturing Apparatus to Device

Figure 15:
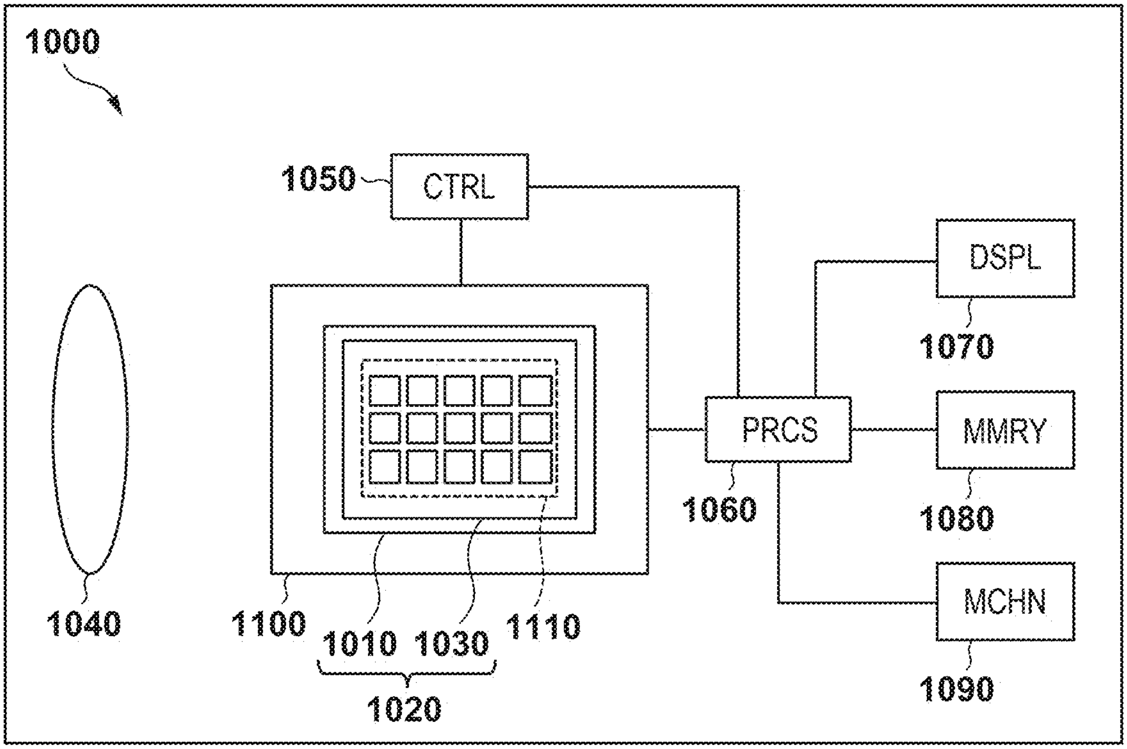
FIG. 15 illustrates an example of application of an image capturing apparatus according to an embodiment to a device.

The following describes a device 1000 that includes a semiconductor device 1100 including a package 1020 on which a semiconductor chip 1110 including a semiconductor integrated circuit is mounted, as shown in FIG. 15. The semiconductor chip 1110 is housed in the package 1020 and mounted on the device 1000. In the configuration shown in FIG. 15, the semiconductor chip 1110 includes the image capturing apparatus according to any of the above-described embodiments. The semiconductor device 1100 can include the package 1020 that includes a base 1010 to which the semiconductor chip 1110 is fixed, and a light-transmitting member 1030 such as a glass member facing the semiconductor chip 1110. Bonding members such as wires or bumps that connect inner leads provided on the base 1010 to terminals such as pad electrodes provided on the semiconductor chip 1110 can be arranged in the package 1020.

The device 1000 can include at least any one or more of an optical device 1040, a control apparatus 1050, a processing apparatus 1060, a display device 1070, a storage device 1080, and/or a mechanical device 1090. The optical device 1040 is, for example, a lens, a shutter, or a mirror. The control apparatus 1050 controls the semiconductor chip 1110. The control apparatus 1050 is, for example, a semiconductor device such as an ASIC.

The processing apparatus 1060 processes the output signal from the image capturing apparatus included in the semiconductor chip 1110. The processing apparatus 1060 is a semiconductor device such as a CPU or ASIC for configuring an analog front end (AFE) or a digital front end (DFE). For example, an image may be generated based on an event signal. The display device 1070 is an EL display device or a liquid crystal display device that displays an information image obtained by the semiconductor chip 1110. The storage device 1080 is a magnetic device or a semiconductor device that stores an information image obtained by the semiconductor chip 1110. The storage device 1080 is a volatile memory such as an SRAM or a DRAM, or a non-volatile memory such as a flash memory or a hard disk drive.

The mechanical device 1090 has a moving portion or a propulsive portion, such as a motor or an engine. In the device 1000, a signal output from the semiconductor chip 1110 is displayed on the display device 1070, or transmitted to the outside by a communication device (not shown) included in the device 1000. To achieve this, the device 1000 may further include the storage device 1080 and the processing apparatus 1060 in addition to the storage circuit and arithmetic circuit included in the semiconductor chip 1110. The mechanical device 1090 may be controlled based on a signal output from the semiconductor chip 1110.

The device 1000 is also suitable for electronic devices such as information terminals having an image capturing function, examples of which include smartphones, wearable terminals, and cameras such as interchangeable lens cameras, compact cameras, video cameras, and surveillance cameras. The mechanical device 1090 in the camera can drive components of the optical device 1040 for zooming, focusing, and shutter operation. Alternatively, the mechanical device 1090 in the camera can move the optical device 1040 for anti-shake operation.

Furthermore, the device 1000 may be a transportation device such as a vehicle, or a ship. The mechanical device 1090 in the transport device may be used as a moving device. In the case of being a transportation device, the device 1000 is suitable for transporting semiconductor chips 1110 and for assisting and/or automating driving operations by using the image capturing function. The processing apparatus 1060 for assisting and/or automating driving operations can perform processing to operate the mechanical device 1090, which is a moving device, based on information obtained by the semiconductor chip 1110. Alternatively, the device 1000 may be a medical device such as an endoscope, a measuring device such as a distance sensor, an analytical device such as an electron microscope, an office device such as a copier, or an industrial device such as a robot.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2024-079717, filed May 15, 2024, which is hereby incorporated by reference herein in its entirety.

What is claimed is:

1. An image capturing control apparatus that causes image capturing to be performed by an image sensor having a plurality of pixel blocks, each of the pixel blocks having a plurality of pixels, the image capturing control apparatus comprising:

a storing unit configured to hold a light emission cycle of a light source that emits light cyclically; and a controller configured to control a first period and a second period in a frame period in the image capturing, the second period following the first period and being shorter than the light emission cycle, wherein, for each of the pixel blocks, based on an exposure condition determined for the pixel block, the controller sets a first exposure period in the first period and sets a second exposure period in the second period, the first exposure period including a charge accumulation period longer than or equal to the light emission cycle.

2. The image capturing control apparatus according to claim 1, wherein when T is the light emission cycle, T1 is the first exposure period, T2 is the second exposure period, λ is the frame period, λ1 is a proper-exposure period set based on the exposure condition for the frame period, α=λ/λ1, and n is an integer of 2 or more, the first exposure period T1 and the second exposure period T2 are set as follows:

$$\text{when } \lambda 1 \geq (1 + 1/n) \times T,\ T1 = \lambda 1 - T2 \text{ and } T2 = T/n,$$

$$\text{when } (1 + 1/n) \times T > \lambda 1 \geq T,\ T1 = T \text{ and } T2 = T/n, \text{ and}$$

$$\text{when } \lambda 1 < T,\ T1 = T \text{ and } T2 = T/\alpha.$$

3. The image capturing control apparatus according to claim 2, wherein n is 2 or 3 or 4.

4. An image processing apparatus that processes an image signal captured by the image sensor controlled by the image capturing control apparatus according to claim 1, the image processing apparatus generating a composite image of a first image captured in the first exposure period and a second image captured in the second exposure period, by performing weighted addition on the first image and the second image with a predetermined ratio for each pixel.

5. The image processing apparatus according to claim 4, comprising:

a memory unit configured to hold the first image, wherein the memory unit holds the first image until processing for generating the composite image ends.

6. The image processing apparatus according to claim 4, wherein the predetermined ratio is based on the exposure condition.

7. The image processing apparatus according to claim 4, wherein when T is the light emission cycle, T1 is the first exposure period, T2 is the second exposure period, λ is the frame period, λ1 is a proper-exposure period set based on the exposure condition for the frame period, α=λ/λ1, n is an integer of 2 or more, a first image signal O1 is an image signal captured in the first exposure period, a second image signal O2 is an image signal captured in the second exposure period, and O3 is the composite image, $$O3 = k \times O1 + O2, \text{ and}$$

a value k indicating the predetermined ratio is set as follows:

$$\text{when } \lambda 1 \geq (1 + 1/n) \times T,\ k = 1,$$

$$\text{when } (1 + 1/n) \times T > \lambda 1 \geq T,\ k = \lambda 1/T - 1/n, \text{ and}$$

$$\text{when } \lambda 1 < T,\ k = ((\lambda/T) - 1)/\alpha.$$

8. The image processing apparatus according to claim 4, wherein the predetermined ratio is determined by comparing a signal difference with a threshold value, the signal difference being a difference between a value of a corrected pixel, which is obtained by correcting a pixel at a predetermined position in the first image with a conversion coefficient that is based on the exposure condition, and a pixel at the predetermined position in the second image.

9. The image processing apparatus according to claim 8, wherein when the signal difference is lower than the threshold value, the predetermined ratio for the first image is set to 0.

10. The image processing apparatus according to claim 4, wherein the composite image is corrected based on the exposure condition.

11. The image processing apparatus according to claim 4, wherein the exposure condition includes a gain for amplifying an image signal obtained from the image sensor.

12. The image processing apparatus according to claim 11, wherein the gain for an image signal captured in the first period is ×1.

13. An image capturing control method for causing image capturing to be performed by an image sensor having a plurality of pixel blocks, each of the pixel blocks having a plurality of pixels, the method comprising:

determining an exposure condition for each of the pixel blocks;

holding a light emission cycle of a light source that emits light cyclically; and setting, based on the exposure condition, a first exposure period in a first period in a frame period in the image capturing and setting a second exposure period in a second period following the first period and shorter than the light emission cycle in the frame period, the first exposure period including a charge accumulation period longer than or equal to the light emission cycle.

14. A non-transitory computer readable storage medium storing a program causing a computer to execute image capturing control, the image capturing control comprising:

determining an exposure condition for each of the pixel blocks;

holding a light emission cycle of a light source that emits light cyclically; and setting, based on the exposure condition, a first exposure period in a first period in a frame period in the image capturing and setting a second exposure period in a second period following the first period and shorter than the light emission cycle in the frame period, the first exposure period including a charge accumulation period longer than or equal to the light emission cycle.

15. An image capturing apparatus comprising:

an image sensor;

an image capturing control apparatus that causes image capturing to be performed by the image sensor having a plurality of pixel blocks, each of the pixel blocks having a plurality of pixels; and an image processing apparatus that processes an image signal captured by the image sensor controlled by the image capturing control apparatus, wherein the image capturing control apparatus comprises a storing unit configured to hold a light emission cycle of a light source that emits light cyclically, and a controller configured to control a first period and a second period in a frame period in the image capturing, the second period following the first period and being shorter than the light emission cycle, wherein, for each of the pixel blocks, based on an exposure condition determined for the pixel block, the controller sets a first exposure period in the first period and sets a second exposure period in the second period, the first exposure period including a charge accumulation period longer than or equal to the light emission cycle, and wherein the image processing apparatus generates a composite image of a first image captured in the first exposure period and a second image captured in the second exposure period, by performing weighted addition on the first image and the second image with a predetermined ratio for each pixel.

16. A device comprising:

the image capturing apparatus according to claim 15; and a processing apparatus configured to process an output signal from the image capturing apparatus.

* * * * *